United States Patent
Thomas et al.

(10) Patent No.: US 12,021,831 B2
(45) Date of Patent: Jun. 25, 2024

(54) NETWORK SECURITY

(71) Applicant: Sophos Limited, Abingdon (GB)

(72) Inventors: Andrew J. Thomas, Oxfordshire (GB);
Mark David Harris, Oxon (GB);
Kenneth D Ray, Seattle, WA (US)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 15/179,547

(22) Filed: Jun. 10, 2016

(65) Prior Publication Data
US 2017/0359306 A1  Dec. 14, 2017

(51) Int. Cl.
*H04L 9/00*  (2022.01)
*G06F 21/52*  (2013.01)
*H04L 9/40*  (2022.01)

(52) U.S. Cl.
CPC ............. *H04L 63/02* (2013.01); *G06F 21/52* (2013.01); *H04L 63/10* (2013.01); *H04L 63/145* (2013.01); *G06F 2221/2133* (2013.01); *H04L 63/20* (2013.01)

(58) Field of Classification Search
CPC ....... H04L 63/02; H04L 63/10; H04L 63/145; H04L 63/20; H04L 63/1408; H04L 63/1441; G06F 21/52; G06F 2221/2133
See application file for complete search history.

(56) References Cited

U.S. PATENT DOCUMENTS

| 5,864,683 | A  | 1/1999  | Boebert et al. |
| 5,870,473 | A  | 2/1999  | Boesch et al. |
| 7,069,330 | B1 | 6/2006  | Mcardle et al. |
| 7,096,498 | B2 | 8/2006  | Judge et al. |
| 7,818,343 | B1 | 10/2010 | Sekhar et al. |
| 7,953,895 | B1 | 5/2011  | Narayanaswamy et al. |
| 7,966,654 | B2 | 6/2011  | Crawford |
| 7,991,902 | B2 | 8/2011  | Cross et al. |
| 8,181,244 | B2 | 5/2012  | Boney |

(Continued)

FOREIGN PATENT DOCUMENTS

| CN | 103650436 | 3/2014 |
| GB | 2512267 | 10/2014 |

(Continued)

OTHER PUBLICATIONS

Abu-Nimeh, Saeed et al., "Profileration and Detection of Blog Spam", IEEE 2010, 6 pages.

(Continued)

*Primary Examiner* — Daniel B Potratz
*Assistant Examiner* — Syed M Ahsan
(74) *Attorney, Agent, or Firm* — Strategic Patents, P.C.

(57) ABSTRACT

A gateway or other network device may be configured to monitor endpoint behavior, and to request a verification of user presence at the endpoint under certain conditions suggesting, e.g., malware or other endpoint compromise. For example, when a network request is directed to a low-reputation or unknown network address, user presence may be verified to ensure that this action was initiated by a human user rather than automatically by malware or the like. User verification may be implicit, based on local behavior such as keyboard or mouse activity, or the user verification may be explicit, such as where a notification is presented on a display of the endpoint requesting user confirmation to proceed.

20 Claims, 10 Drawing Sheets

(56) References Cited

U.S. PATENT DOCUMENTS

| | | | |
|---|---|---|---|
| 8,201,243 B2 | 6/2012 | Boney | |
| 8,365,272 B2 | 1/2013 | Touboul | |
| 8,418,250 B2 | 4/2013 | Morris et al. | |
| 8,499,350 B1 | 7/2013 | Satish et al. | |
| 8,533,780 B2 | 9/2013 | Parla et al. | |
| 8,621,549 B2 | 12/2013 | Lim | |
| 8,631,488 B2 | 1/2014 | Oz et al. | |
| 8,719,932 B2 | 5/2014 | Boney | |
| 8,726,389 B2 | 5/2014 | Morris et al. | |
| 8,739,272 B1 | 5/2014 | Cooper et al. | |
| 8,763,123 B2 | 6/2014 | Morris et al. | |
| 8,856,505 B2 | 10/2014 | Schneider | |
| 9,060,297 B1 | 6/2015 | Reeves et al. | |
| 9,106,683 B2 | 8/2015 | Oz et al. | |
| 9,119,017 B2 | 8/2015 | Sinha | |
| 9,154,520 B1* | 10/2015 | Cooley | H04L 63/1408 |
| 9,223,961 B1 | 12/2015 | Sokolov | |
| 9,246,801 B1 | 1/2016 | Kompella | |
| 9,294,492 B1 | 3/2016 | Martini et al. | |
| 9,413,721 B2 | 8/2016 | Morris et al. | |
| 9,503,460 B2 | 11/2016 | Gladstone et al. | |
| 9,578,045 B2 | 2/2017 | Jaroch et al. | |
| 9,686,156 B2 | 6/2017 | Wang et al. | |
| 9,747,444 B1 | 8/2017 | Touboul | |
| 9,756,079 B2 | 9/2017 | Touboul | |
| 9,781,164 B2 | 10/2017 | Touboul | |
| 9,843,595 B2 | 12/2017 | Oz et al. | |
| 9,852,294 B1 | 12/2017 | Zhu | |
| 9,967,282 B2 | 5/2018 | Thomas et al. | |
| 9,967,283 B2 | 5/2018 | Ray et al. | |
| 10,129,194 B1 | 11/2018 | Jakobsson | |
| 10,147,065 B1 | 12/2018 | Yiftachel et al. | |
| 10,257,224 B2 | 4/2019 | Jaroch et al. | |
| 10,454,950 B1* | 10/2019 | Aziz | H04L 63/1425 |
| 2002/0013845 A1 | 1/2002 | Aoi et al. | |
| 2003/0055994 A1* | 3/2003 | Herrmann | H04L 12/2856 709/229 |
| 2003/0073406 A1 | 4/2003 | Benjamin et al. | |
| 2003/0090995 A1 | 5/2003 | Illikkal et al. | |
| 2003/0177374 A1 | 9/2003 | Yung et al. | |
| 2004/0125797 A1 | 7/2004 | Raisanen | |
| 2005/0055578 A1 | 3/2005 | Wright et al. | |
| 2006/0117385 A1 | 6/2006 | Mester et al. | |
| 2006/0168057 A1 | 7/2006 | Warren et al. | |
| 2006/0253578 A1 | 11/2006 | Dixon et al. | |
| 2007/0079379 A1 | 4/2007 | Sprosts et al. | |
| 2007/0211745 A1 | 9/2007 | Deshpande et al. | |
| 2007/0223389 A1 | 9/2007 | Basso et al. | |
| 2008/0082662 A1* | 4/2008 | Dandliker | H04L 63/10 709/225 |
| 2008/0141376 A1 | 6/2008 | Clausen et al. | |
| 2008/0165964 A1 | 7/2008 | Lewis et al. | |
| 2009/0126003 A1 | 5/2009 | Touboul | |
| 2009/0138486 A1 | 5/2009 | Hydrie et al. | |
| 2009/0241170 A1 | 9/2009 | Kumar et al. | |
| 2010/0212010 A1 | 8/2010 | Stringer et al. | |
| 2010/0250341 A1 | 9/2010 | Hauser | |
| 2010/0263060 A1 | 10/2010 | Charbonneau et al. | |
| 2010/0318679 A1 | 12/2010 | Lavoie et al. | |
| 2010/0328074 A1* | 12/2010 | Johnson | G06F 21/31 340/573.1 |
| 2011/0023115 A1* | 1/2011 | Wright | G06F 21/552 726/22 |
| 2011/0047594 A1 | 2/2011 | Mahaffey et al. | |
| 2011/0066565 A1 | 3/2011 | Day et al. | |
| 2011/0149962 A1 | 6/2011 | Ait-Ameur et al. | |
| 2011/0199902 A1 | 8/2011 | Leavy et al. | |
| 2011/0202678 A1 | 8/2011 | Lavoie et al. | |
| 2011/0302656 A1* | 12/2011 | El-Moussa | H04L 63/1416 726/24 |
| 2012/0110672 A1 | 5/2012 | Judge et al. | |
| 2012/0124185 A1 | 5/2012 | Kacin et al. | |
| 2012/0137364 A1 | 5/2012 | Blaisdell | |
| 2012/0210422 A1 | 8/2012 | Friedrichs et al. | |
| 2012/0324568 A1 | 12/2012 | Wyatt et al. | |
| 2013/0145463 A1 | 6/2013 | Ghosh et al. | |
| 2013/0232338 A1* | 9/2013 | Byres | H04L 41/0806 713/162 |
| 2014/0003434 A1 | 1/2014 | Assarpour et al. | |
| 2014/0016501 A1 | 1/2014 | Kamath et al. | |
| 2014/0071895 A1 | 3/2014 | Bane et al. | |
| 2014/0123279 A1 | 5/2014 | Bishop et al. | |
| 2014/0334304 A1 | 11/2014 | Zang et al. | |
| 2015/0096008 A1 | 4/2015 | Short et al. | |
| 2015/0121449 A1 | 4/2015 | Cp et al. | |
| 2015/0188885 A1 | 7/2015 | Jäger | |
| 2015/0188949 A1* | 7/2015 | Mahaffey | H04L 63/20 726/1 |
| 2015/0249641 A1* | 9/2015 | Yu | H04L 63/1416 726/7 |
| 2015/0288601 A1 | 10/2015 | Jiang et al. | |
| 2015/0310196 A1* | 10/2015 | Turgeman | H04W 12/06 726/19 |
| 2015/0312266 A1 | 10/2015 | Thomas | |
| 2015/0312267 A1 | 10/2015 | Thomas | |
| 2015/0312268 A1* | 10/2015 | Ray | H04L 63/0227 726/23 |
| 2015/0326486 A1 | 11/2015 | Zawadowskiy et al. | |
| 2015/0350071 A1 | 12/2015 | Pauly et al. | |
| 2015/0371043 A1 | 12/2015 | Bejerasco et al. | |
| 2015/0373039 A1 | 12/2015 | Wang | |
| 2016/0072717 A1 | 3/2016 | Ansari et al. | |
| 2016/0080417 A1 | 3/2016 | Thomas et al. | |
| 2016/0080419 A1 | 3/2016 | Schiappa et al. | |
| 2016/0117911 A1* | 4/2016 | Gear | G06F 1/3231 340/686.6 |
| 2016/0134646 A1* | 5/2016 | Wing | H04L 63/1408 726/23 |
| 2016/0188878 A1 | 6/2016 | Kulkarni et al. | |
| 2016/0191465 A1 | 6/2016 | Thomas et al. | |
| 2016/0269430 A1 | 9/2016 | Laswell et al. | |
| 2016/0359897 A1 | 12/2016 | Yadav et al. | |
| 2016/0366176 A1 | 12/2016 | Bennison et al. | |
| 2016/0381210 A1* | 12/2016 | Kenjalkar | H04L 67/02 455/419 |
| 2017/0099306 A1 | 4/2017 | Chiu et al. | |
| 2017/0185758 A1 | 6/2017 | Oliker et al. | |
| 2017/0310686 A1 | 10/2017 | Ray et al. | |
| 2017/0310708 A1 | 10/2017 | Schiappa | |
| 2018/0278649 A1 | 9/2018 | Thomas et al. | |
| 2018/0278650 A1 | 9/2018 | Ray et al. | |
| 2019/0268302 A1 | 8/2019 | Mcdonald | |
| 2019/0268303 A1 | 8/2019 | Schiappa et al. | |

FOREIGN PATENT DOCUMENTS

| | | |
|---|---|---|
| WO | WO-2004021206 | 3/2004 |
| WO | WO-2011032487 | 3/2011 |
| WO | WO-2015101337 | 7/2015 |
| WO | WO-2016038397 | 3/2016 |

OTHER PUBLICATIONS

USPTO, "U.S. Appl. No. 15/136,687 Non-Final Office Action dated Oct. 12, 2017", 20 pages.

USPTO, "U.S. Appl. No. 15/136,762 Non-Final Office Action dated Dec. 15, 2017", 25 pages.

Qualcomm, "Zeroth Platform", https://www.qualcomm.com/invention/cognitivetechnologies/zeroth Mar. 2, 2015, 13 pages.

Qualcomm, "Security and Privacy Vision", https://www.qualcomm.com/invention/cognitivetechnologies/securityprivacyvision Jun. 23, 2015, 12 Pages.

Qualcomm, "Security and Privacy Vision Presentation", https://www.qualcomm.com/invention/cognitivetechnologies Jun. 23, 2015, 31 pages.

Qualcomm, "The rise of machine learning against malware [VIDEO]", https://www.qualcomm.com/news/onq/2015/07/31/risemachinelearningagainstmalware Jul. 31, 2015, 7 Pages.

Qualcomm, "Bringing cognitive technologies to life.", https://www.qualcomm.com/invention/cognitivetechnologies Feb. 4, 2015, 12 Pages.

(56) References Cited

OTHER PUBLICATIONS

CNET, "Are your apps acting creepy? New approach to phone security could tip you off", http://www.cnet.com/news/areyourappsactingcreepynewapproachtophonesecuritycouldtipyouoff/ Aug. 31, 2015, 7 Pages.
IPO, "Application No. GB1610621.3 Search Report Dated Jan. 23, 2017", 4 Pages.
IPO, "UK Application No. 1610719.5 Combined Search and Examination Report dated Jan. 26, 2017", 7 pages.
USPTO, "U.S. Appl. No. 15/136,687 Final Office Action dated Mar. 26, 2018", 10 pages.
USPTO, "U.S. Appl. No. 15/136,687 Non-Final Office Action dated Nov. 14, 2018", 10 pages.
USPTO, "U.S. Appl. No. 15/136,762 Final Office Action dated Sep. 6, 2018", 19 pages.
USPTO, "U.S. Appl. No. 15/136,687 Final Office Action dated Apr. 9, 2019", 15 pages.
USPTO, "U.S. Appl. No. 15/136,762 Notice of Allowance dated Feb. 28, 2019", 9 pages.
Ashraf, et al., "A Heterogeneous Service-Oriented Deep Packet Inspection and Analysis Framework for Traffic-Aware Network Management and Security Systems", Sep. 14, 2016, 19 pages.
USPTO, "U.S. Appl. No. 15/136,687 Non-Final Office Action dated Oct. 9, 2019", 9 pages.
USPTO, "U.S. Appl. No. 16/406,318 Non-Final Office Action dated Sep. 6, 2019", 20 pages.
USPTO, "U.S. Appl. No. 15/136,762 Notice of Allowance dated Jan. 7, 2020", 9 pages.
USPTO, "U.S. Appl. No. 16/406,318 Notice of Allowance dated Mar. 5, 2020", 10 pages.
USPTO, "U.S. Appl. No. 15/136,687 Final Office Action dated Apr. 17, 2020", 12 pages.
USPTO, "U.S. Appl. No. 15/136,762 Notice of Allowance dated Apr. 30, 2020", 5 pages.
IPO, "UK Application No. 1610719.5 Examination Report dated Jan. 8, 2020", 3 pages.
UKIPO, "UK Application Serial No. 1610719.5 Examination Report dated May 5, 2020", 2 pages.
UKIPO, "Appln Serial No. 1610719.5 Examination Report dated Jul. 9, 2020", 2 pages.
USPTO, "U.S. Appl. No. 15/136,687 Final Office Action dated Dec. 16, 2020", 12 pages.
USPTO, "U.S. Appl. No. 15/136,762 Notice of Allowance dated Sep. 3, 2020", 7 pages.
USPTO, "U.S. Appl. No. 15/136,687 Non-Final Office Action dated Aug. 18, 2020", 12 pages.
IPO, "UK Application No. 1610621.3 First Examination Report dated Jun. 1, 2021", 5 pages.
USPTO, "U.S. Appl. No. 15/136,687 Notice of Allowance dated Aug. 24, 2021", 11 pages.
USPTO, "U.S. Appl. No. 16/412,687 Non-Final Office Action dated Jul. 27, 2021", 19 pages.
Ahmed, et al., "A survey of network anomaly detection techniques", Elsevier 2016, 13 pages.
Shah, et al., "A Survey: Internet ofThings (IOT) Technologies, Applications and Challenges", IEEE 2016, 5 pages.
Haq, et al., "Application of Machine Learning Approaches in Intrusion Detection System", A Survey. IJARAI 2015, 10 pages.
Ndibwile, et al., "Web Server Protection against Application Layer DDOS Attacks using Machine Learning and Traffic Authentication", IEEE 2015, 7 pages.
Omar, et al., "Machine Learning Techniques for Anomaly Detection: An Overview", IJCA 2013, 9 pages.
Nguyen, et al., "A Survey of Techniques for Internet Traffic Classification using Machine Learning", IEEE 2008, 21 pages.
Masud, et al., "Flow-based Identification of Botnet Traffic by Mining Multiple Log Files", IEEE 2008, 7 pages.
USPTO, "U.S. Appl. No. 15/136,687 Notice of Allowance dated Nov. 8, 2021", 12 pages.
USPTO, "U.S. Appl. No. 16/412,687 Non-Final Office Action dated Apr. 28, 2022", 25 pages.
USPTO, "U.S. Appl. No. 16/412,687 Final Office Action dated Mar. 1, 2022", 24 pages.
USPTO, "U.S. Appl. No. 16/412,687 Final Office Action dated Nov. 9, 20022", 27 pages.

\* cited by examiner

NETWORK SECURITY

RELATED APPLICATIONS

This application is related to the following commonly-owned U.S. patent applications that are incorporated herein by reference in their entirety: U.S. application Ser. No. 15/136,687 filed on Apr. 22, 2016 entitled "Labeling Network Flows According to Source Applications," and U.S. application Ser. No. 15/136,762 filed on Apr. 22, 2016 entitled "Secure Labeling of Network Flows."

TECHNICAL FIELD

This application relates to techniques for improving network security on business and home networks, and on mobile devices.

BACKGROUND

There is a need for improved home and business (e.g., enterprise) network security to prevent compromise, e.g., data leakage, damage, and other negative consequences for compromised endpoints. Even with the techniques that are currently available, it remains possible for attackers to compromise endpoints.

In addition, an increase in the use of mobile devices has coincided with an increase in malware that targets mobile operating systems and applications included on mobile devices. Mobile devices typically have different operating systems and software architectures, different capabilities, and different user interactions than other computing devices, and they are often attached to a different network infrastructure—specifically a cellular telephony environment—with different service providers. This computing environment presents specific vulnerabilities and security challenge. There remains a need for improved security techniques to address the growing number, type, and sophistication of malicious attacks targeting mobile devices.

SUMMARY

In general, in an aspect, a gateway or other network device is configured to monitor endpoint behavior, and to request a verification of user presence at the endpoint under certain conditions suggesting, e.g., malware or other endpoint compromise. For example, when a network request is directed to a low-reputation or unknown network address, user presence may be verified to ensure that this action was initiated by a human user rather than automatically by malware or the like. User verification may be implicit, based on local behavior such as keyboard or mouse activity, or the user verification may be explicit, such as where a notification is presented on a display of the endpoint requesting user confirmation to proceed.

In an aspect, a computer program product for monitoring network security based on endpoint user presence may include computer executable code embodied in a non-transitory computer readable medium that, when executing on a gateway in an enterprise network, performs the steps of connecting an endpoint to a data network through the gateway, detecting a network request by a process executing on the endpoint to a remote resource that presents a potential security risk including at least one of a request to download an executable in violation of a network security policy or a request directed to an unknown address in violation of the network security policy, evaluating a status of the endpoint to determine whether a user is present at the endpoint, and executing a security measure in response to the network request when no user is detected at the endpoint.

Implementations may include one or more of the following features. Evaluating the status of the endpoint may include examining a secure heartbeat from the endpoint for information about whether the user is present. Evaluating the status of the endpoint may include transmitting a request to the endpoint for a user input. The status may include whether a user is logged in to the endpoint. The status may include whether a display of the endpoint is locked. The status may include a record of keyboard or mouse activity within a predetermined time window.

In an aspect, a method of operating a gateway includes connecting an endpoint to a data network through the gateway, detecting a network request by a process executing on the endpoint to a remote resource that presents a potential security risk, evaluating a status of the endpoint to determine whether a user is present at the endpoint, and executing a security measure in response to the network request when no user is detected at the endpoint.

Implementations may include one or more of the following features. The network request may include a request for a download of an executable from the data network. The network request may include a request directed to an unknown address. The network request may include a request directed to a known source of malware. Evaluating the status of the endpoint may include querying the endpoint about whether the user is present. Evaluating the status of the endpoint may include examining a secure heartbeat from the endpoint for information about whether the user is present. Evaluating the status of the endpoint may include transmitting a request to the endpoint for a user input. The status may include whether a user is logged in to the endpoint. The status may include whether a display of the endpoint is locked. The status may include a record of keyboard or mouse activity within a predetermined time window.

In an aspect, a system includes a network device including a network interface configured to couple in a communicating relationship with a data network that includes an endpoint, a memory on the network device, and a processor on the network device. The processor may be configured to execute instructions stored in the memory to perform the steps of connecting an endpoint to the network device through the network interface, detecting a network request by a process executing on the endpoint to a remote resource that presents a potential security risk, evaluating a status of the endpoint to determine whether a user is present at the endpoint, and executing a security measure in response to the network request when no user is detected at the endpoint.

Implementations may include one or more of the following features. The network device may include a firewall. The network device may include a gateway. The network device may include a threat management facility.

In an aspect, a system includes an endpoint including a network interface configured to couple the endpoint in a communicating relationship with a data network, a memory on the endpoint, and a processor on the endpoint. The processor may be configured to execute instructions stored in the memory to perform the steps of monitoring a status of the endpoint, periodically creating a status indicator characterizing the status, generating a user presence indicator containing an indication of whether a human user is present at the endpoint, creating a heartbeat containing the status indicator and the user presence indicator, and transmitting the heartbeat through the network interface to a gateway that couples the endpoint to a data network.

Securing a mobile device against malware may include an analysis of events executing on the mobile device to detect and identify unexpected behaviors and events, and further determining whether these unexpected behaviors and events are authorized or unauthorized. Specific runtime events may be compared to patterns of expected user input/interaction on the mobile device, or generalized background behavior patterns occurring without user input/interaction, to determine whether events are expected or unexpected, and/or to determine whether events are authorized or potentially malicious. Examples of unexpected and potentially malicious events on mobile devices, particularly when they occur without specific user interaction, may include making phone calls, accessing or making changes to the contacts/phone book, accessing user habits such as browser settings/history and other communication logs, accessing files, accessing the camera and audio, and so forth.

In an aspect, a method for securing a mobile device against malware includes monitoring a plurality of events executed on a mobile device, and detecting a first event in the plurality of events, where the first event is an unexpected event generated by an application executing on the mobile device while a user of the mobile device is not interacting with the application. The method may also include evaluating the first event in a context of the mobile device to determine whether the first event is potentially unauthorized, and when the first event is a potentially unauthorized event, presenting a warning to the user on the mobile device that the potentially unauthorized event has occurred, and requesting user confirmation that the potentially unauthorized event be allowed to continue.

Implementations may include one or more of the following features. The application may control a camera of the mobile device, or the application may control a microphone of the mobile device. The application may be a communication application, a phone application, or an instant messaging application. The first event may be an instant message or a phone call incurring a charge to the user. The first event may include a Uniform Resource Locator (URL) request. The context may include one or more other events functionally associated with the event, one or more other events temporally associated with the event, a history of recent user interactions with the mobile device, or a history of recent user interactions with the application. The first event may include access to one or more of a browsing history, personal contacts, and a communications log on the mobile device. The context may include a time of the first event, or a reputation of the application. The reputation may be based on one or more of a popularity of the application, a reputation of a provider of the application, and an installed base of the application among a population of users.

In an aspect, a computer program product for securing a mobile device against malware may include computer executable code embodied in a non-transitory computer readable medium that, when executing on a mobile device, performs the steps of monitoring a plurality of events executed on a mobile device, and detecting a first event in the plurality of events, where the first event is an unexpected event generated by an application executing on the mobile device while a user of the mobile device is not interacting with the application. The code may also perform the steps of evaluating the first event in a context of the mobile device to determine whether the first event is potentially unauthorized, and when the first event is a potentially unauthorized event, presenting a warning to the user on the mobile device that the potentially unauthorized event has occurred, and requesting user confirmation that the potentially unauthorized event be allowed to continue.

In an aspect, a mobile device includes a display, a communications interface configured to couple the mobile device in a communicating relationship with a network, a processor, and a memory bearing computer code that, when executing on the processor, performs the steps of monitoring a plurality of events executed on the mobile device, and detecting a first event in the plurality of events, where the first event is an unexpected event generated by an application executing on the mobile device while a user of the mobile device is not interacting with the application. The code may also perform the steps of evaluating the first event in a context of the mobile device to determine whether the first event is potentially unauthorized, and when the first event is a potentially unauthorized event, presenting a warning to the user that the potentially unauthorized event has occurred.

Implementations may include one or more of the following features. The mobile device may be at least one of a smart phone and a tablet. The mobile device may further include at least one of a camera and a microphone.

In an aspect, a computer program product for managing network flows may include computer executable code embodied in a non-transitory computer readable medium that, when executing on a network device, performs the step of receiving a network message from an endpoint at the network device, the network message including a source address for the endpoint, a destination address for an intended recipient of the network message, a label that identifies an application that generated the network message on the endpoint, and a payload of data. The code may also perform the steps of processing the network message on the network device to extract the label, determining a reputation of the application, and routing the network message to the destination address conditionally based on the reputation of the application that generated the network message.

Implementations may include one or more of the following features. The code may also perform the step of caching the label for the application and the reputation of the application on the network device. The label may include a name of the endpoint. The label may be cryptographically signed by the endpoint. The label may include the reputation of the application, or a user identifier that identifies a user of the application on the endpoint. The network device may include a gateway, a router, or a threat management facility for an enterprise network that includes the endpoint.

In an aspect, a method for managing network flows based on sources of data may include receiving a network message from an endpoint at a network device, the network message including a source address for the endpoint, a destination address for an intended recipient of the network message, a label that identifies an application that generated the network message on the endpoint, and a payload of data. The method may also include processing the network message on the network device to extract the label, and routing the network message based on the application that generated the network message.

Implementations may include one or more of the following features. The method may also include caching the label for the application and a reputation of the application on the network device. The label may include a name of the endpoint. The label may be cryptographically signed by the endpoint. The label may include the reputation of the application, or a user identifier that identifies a user of the application on the endpoint.

In an aspect, a system may include a network device including a network interface configured to couple the network device in a communicating relationship with a data network that includes an endpoint, a memory on the network device, and a processor on the network device. The processor may be configured to execute instructions stored in the memory to perform the steps of receiving a network message from an endpoint through the network interface, the network message including a source address for the endpoint, a destination address for an intended recipient of the network message, a label that identifies an application that generated the network message on the endpoint, and a payload of data, processing the network message to extract the label, and routing the network message based on the application that generated the network message.

Implementations may include one or more of the following features. The network device may include at least one of a gateway, a router, and a threat management facility. The processor may be further configured to perform the steps of determining a reputation of the application and routing the network message to the destination address conditionally based on the reputation of the application that generated the network message. The processor may be further configured to extract a user identifier from the label that identifies a user of the application on the endpoint.

In an aspect, a system may include an endpoint including a network interface configured to couple the endpoint in a communicating relationship with a data network, a memory on the endpoint, and a processor on the endpoint. The processor may be configured to execute instructions stored in the memory to perform the steps of generating a label for a network message created by a process executing on the endpoint and associated with an application, where the network message includes a payload and a header and where the label includes an identifier for the application, adding the label to the header of the network message, and transmitting the network message through the network interface to a remote location on the data network.

In an aspect, a computer program product for managing network flows at an endpoint may include computer executable code embodied in a non-transitory computer readable medium that, when executing on one or more computing devices, performs the step of receiving a network message from a process executing on the endpoint, where the process is based on an application and where the network message includes a payload and a header and is addressed to a remote location accessible from the endpoint through a data network. The code may also perform the steps of generating a label for the network message, the label including information about a source of the network message on the endpoint, cryptographically signing the label to provide a signed label verifying an identity of the endpoint, adding the signed label to the header of the network message, and transmitting the network message from the endpoint to the remote location through the data network.

Implementations may include one or more of the following features. The label may include an identifier for the application, an identifier for the endpoint, or an identifier of a user of the process on the endpoint. The computer program product may further include code that performs the step of encrypting information within the label. The label may include a health status of the endpoint.

In an aspect, a method for managing network flows at an endpoint may include receiving a network message from a process executing on the endpoint, where the process is based on an application and where the network message includes a payload and a header. The network message may be addressed to a remote location accessible from the endpoint through a data network. The method may also include generating a label for the network message, the label including information about a source of the network message on the endpoint, encrypting the label with a cryptographic key thereby providing an encrypted label, adding the encrypted label to the header of the network message, and transmitting the network message from the endpoint to the remote location through the data network.

Implementations may include one or more of the following features. The label may include an identifier for the application, an identifier for the endpoint, an identifier of a user of the process on the endpoint, or a health status of the endpoint. Encrypting the label may include cryptographically signing the label.

In an aspect, a system may include an endpoint including a network interface configured to couple the endpoint in a communicating relationship with a data network, a memory on the endpoint, and a processor on the endpoint. The processor may be configured to execute instructions stored in the memory to perform the steps of receiving a network message from a process executing on the endpoint, where the process is based on an application and where the network message includes a payload and a header, the network message addressed to a remote location accessible from the endpoint through a data network, generating a label for the network message, the label including information about a source of the network message on the endpoint, encrypting the label with a cryptographic key thereby providing an encrypted label, adding the encrypted label to the header of the network message, and transmitting the network message from the endpoint to the remote location through the data network.

Implementations may include one or more of the following features. The label may include an identifier for the application. Encrypting the label may include cryptographically signing the label.

In an aspect, a method for managing network flows at a network device may include receiving a network message from an endpoint at the network device. The network message may include a source address for the endpoint, a destination address for an intended recipient of the network message, an encrypted label that identifies an application that generated the network message on the endpoint, and a payload of data. The method may also include processing the network message on the network device to extract the label, decrypting the encrypted label with a cryptographic key to provide a decrypted label, and routing the network message based on the decrypted label.

Implementations may include one or more of the following features. The encrypted label may be signed to enable cryptographic verification of a source of the encrypted label. The method may also include receiving an indication that the application is compromised and preventing routing of additional network traffic for the application through the network device. The method may further include detecting an absence of an expected heartbeat from the endpoint for the application and preventing routing of additional network traffic for the application through the network device until the expected heartbeat is received. The network device may include at least one of a gateway, a firewall, a router, and a threat management facility.

In an aspect, a computer program product for monitoring network security based on endpoint user presence may include computer executable code embodied in a non-transitory computer readable medium that, when executing on a gateway in an enterprise network, performs the steps of connecting an endpoint to a data network through the gateway, detecting a network request by a process executing on the endpoint to a remote resource that presents a potential security risk including at least one of a request to download an executable in violation of a network security policy or a request directed to an unknown address in violation of the network security policy, evaluating a status of the endpoint to determine whether a user is present at the endpoint, and executing a security measure in response to the network request when no user is detected at the endpoint.

Implementations may include one or more of the following features. Evaluating the status of the endpoint may include examining a secure heartbeat from the endpoint for information about whether the user is present. Evaluating the status of the endpoint may include transmitting a request to the endpoint for a user input. The status may include whether a user is logged in to the endpoint, whether a display of the endpoint is locked, or a record of keyboard or mouse activity within a predetermined time window.

In an aspect, a method of operating a gateway may include connecting an endpoint to a data network through the gateway, detecting a network request by a process executing on the endpoint to a remote resource that presents a potential security risk, evaluating a status of the endpoint to determine whether a user is present at the endpoint, and executing a security measure in response to the network request when no user is detected at the endpoint.

Implementations may include one or more of the following features. The network request may include a request for a download of an executable from the data network, a request directed to an unknown address, or a request directed to a known source of malware. Evaluating the status of the endpoint may include querying the endpoint about whether the user is present. Evaluating the status of the endpoint may include examining a secure heartbeat from the endpoint for information about whether the user is present. Evaluating the status of the endpoint may include transmitting a request to the endpoint for a user input. The status may include whether a user is logged in to the endpoint, whether a display of the endpoint is locked, or a record of keyboard or mouse activity within a predetermined time window.

In an aspect, a system may include a network device including a network interface configured to couple in a communicating relationship with a data network that includes an endpoint, a memory on the network device, and a processor on the network device. The processor may be configured to execute instructions stored in the memory to perform the steps of connecting an endpoint to the network device through the network interface, detecting a network request by a process executing on the endpoint to a remote resource that presents a potential security risk, evaluating a status of the endpoint to determine whether a user is present at the endpoint, and executing a security measure in response to the network request when no user is detected at the endpoint.

Implementations may include one or more of the following features. The network device may include a firewall, a gateway, or a threat management facility.

In an aspect, a system may include an endpoint including a network interface configured to couple the endpoint in a communicating relationship with a data network, a memory on the endpoint, and a processor on the endpoint. The processor may be configured to execute instructions stored in the memory to perform the steps of monitoring a status of the endpoint, periodically creating a status indicator characterizing the status, generating a user presence indicator containing an indication of whether a human user is present at the endpoint, creating a heartbeat containing the status indicator and the user presence indicator, and transmitting the heartbeat through the network interface to a gateway that couples the endpoint to a data network.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

Figure 1:
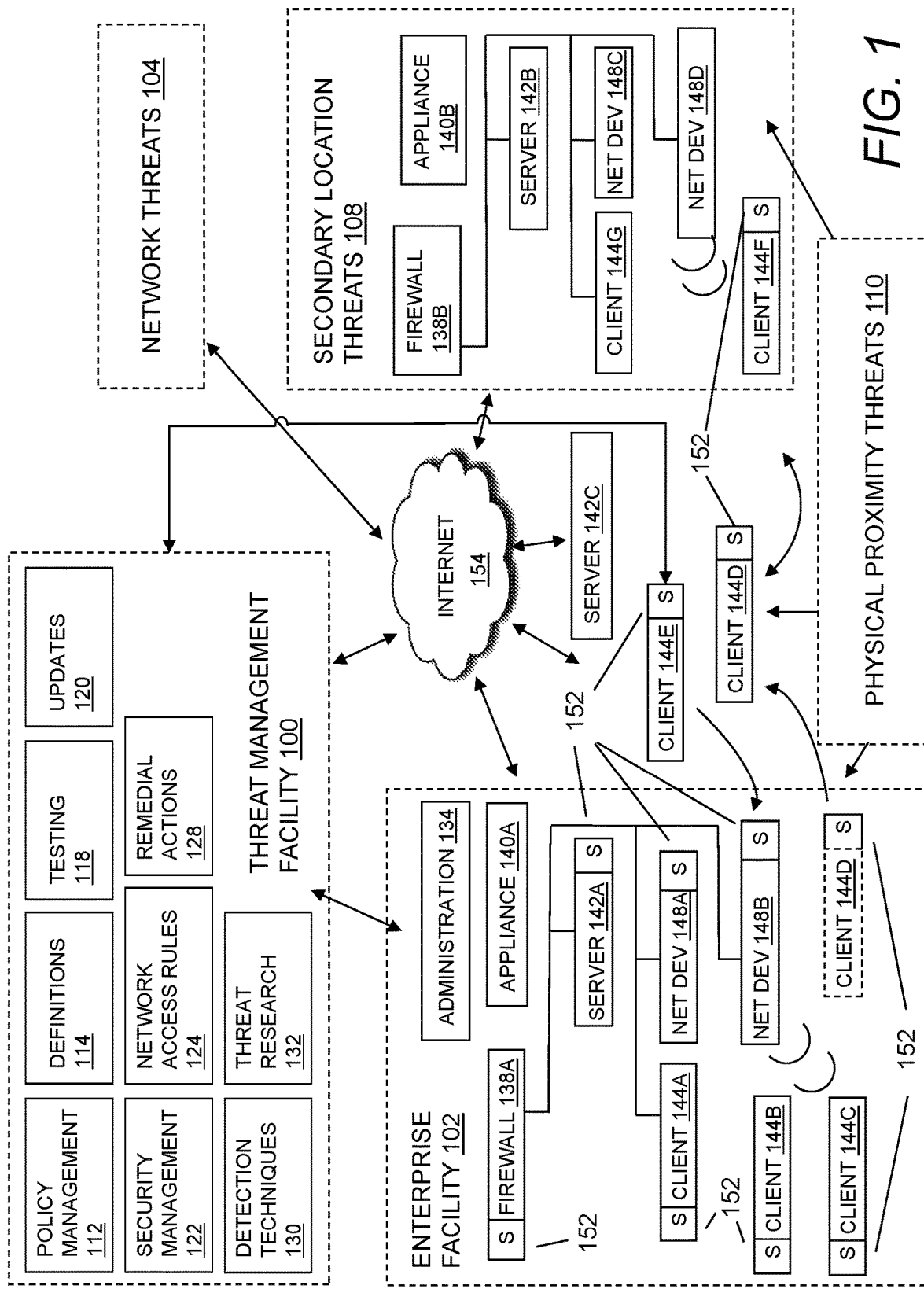
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach. It should be understood that an enterprise model is applicable to organizations and users of any size or type. For example, an enterprise may be or may include a group or association of endpoints, networks, users, and the like within or outside of one or more protected locations. It should be understood that an enterprise may include one or more offices or business locations, or one or more homes, where each location, or portions of each location, or a collection of locations may be treated as a client facility.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
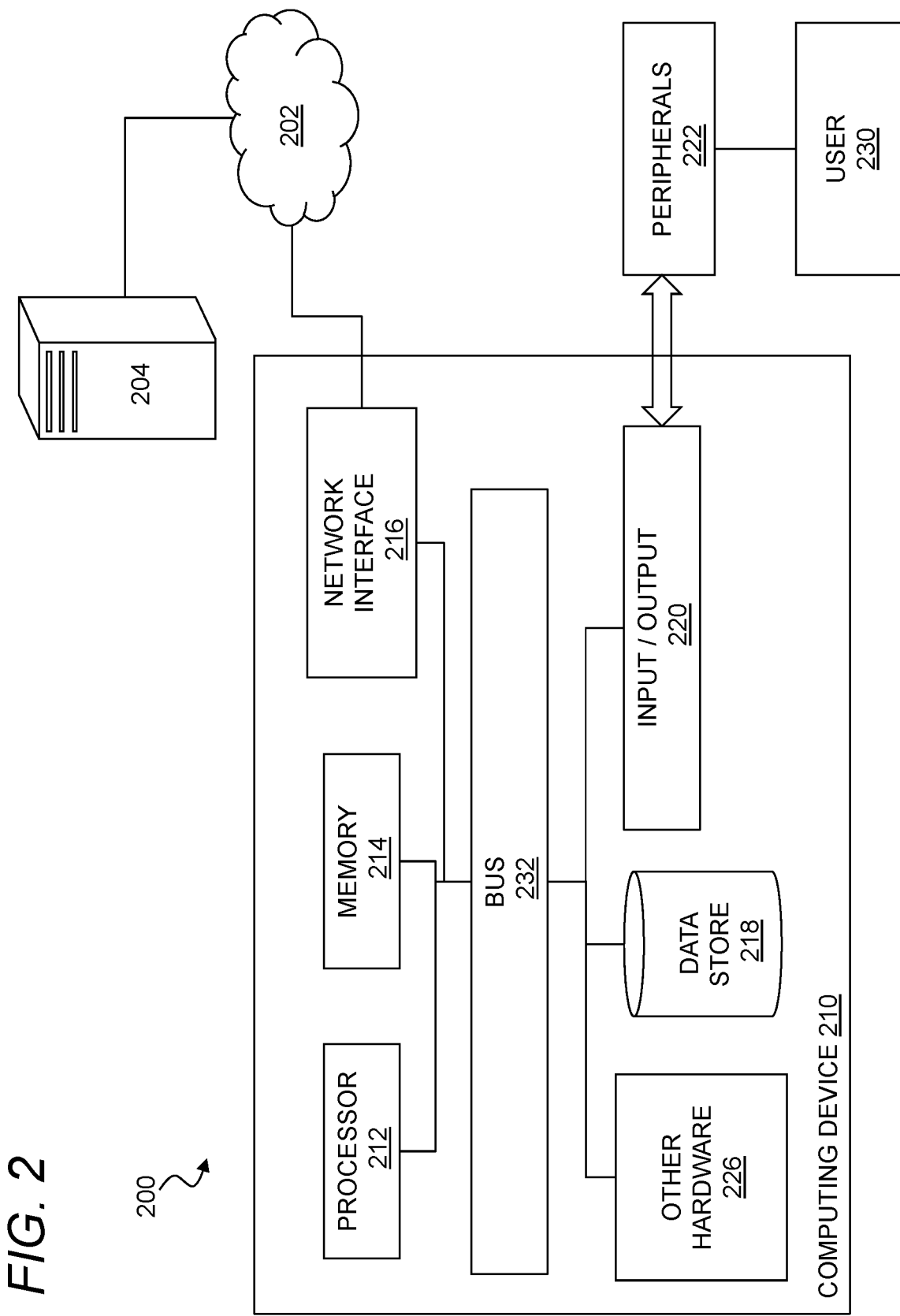
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware (e.g., a desktop computer), software (e.g., in a virtual machine or the like), or a combination of software and hardware (e.g., with programs executing on the desktop computer), and the computing device 210 may be a stand-alone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
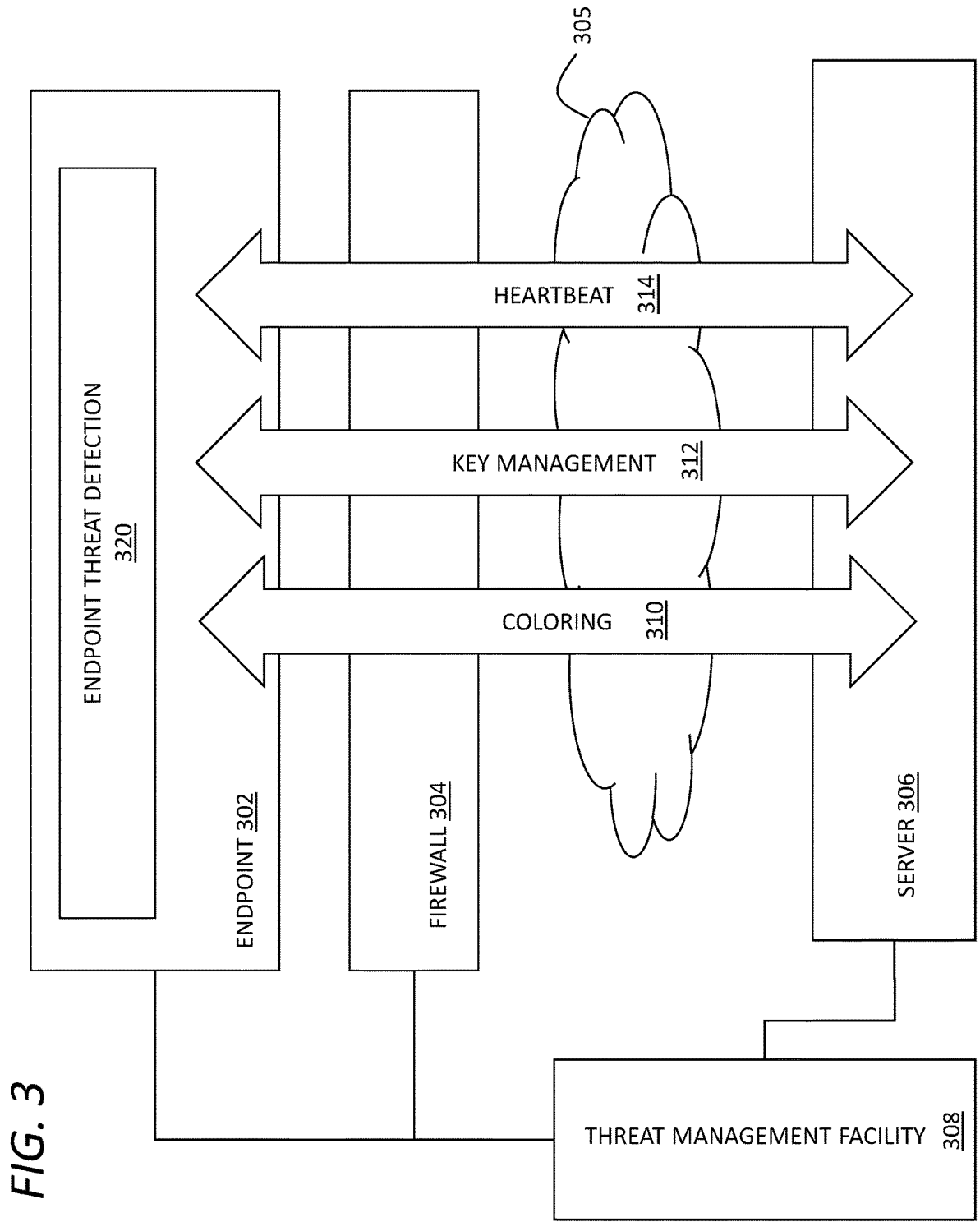
FIG. 3 illustrates a threat management system.

FIG. 3 illustrates a threat management system as contemplated herein. In general, the system may include an endpoint 302, a firewall 304, a server 306 and a threat management facility 308 coupled to one another directly or indirectly through a data network 305, all as generally described above. Each of the entities depicted in FIG. 3 may, for example, be implemented on one or more computing devices such as the computing device described above with reference to FIG. 2. A number of systems may be distributed across these various components to support threat detection, such as a coloring system 310, a key management system 312 and a heartbeat system 314, each of which may include software components executing on any of the foregoing system components, and each of which may communicate with the threat management facility 308 and an endpoint threat detection agent 320 executing on the endpoint 302 to support improved threat detection and remediation.

The coloring system 310 may be used to label or 'color' software objects for improved tracking and detection of potentially harmful activity. The coloring system 310 may, for example, label files, executables, processes, network communications, data sources and so forth with any suitable. A variety of techniques may be used to select static and/or dynamic labels for any of these various software objects, and to manage the mechanics of applying and propagating coloring information as appropriate. For example, a process may inherit a color from an application that launches the process. Similarly a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 310 as contemplated herein. A suitable coloring system is described in greater detail below with reference to FIG. 4.

The key management system 312 may support management of keys for the endpoint 302 in order to selectively permit or prevent access to content on the endpoint 302 on a file-specific basis, a process-specific basis, an application-specific basis, a user-specific basis, or any other suitable basis in order to prevent data leakage, and in order to support more fine-grained and immediate control over access to content on the endpoint 302 when a security compromise is detected. Thus for example, if a particular process executing on the endpoint is compromised, or potentially compromised or otherwise under suspicion, keys to that process may be revoked in order to prevent, e.g., data leakage or other malicious activity. A suitable key management system useful in this context is described in greater detail below with reference to FIG. 5.

The heartbeat system 314 may be used to provide periodic or aperiodic information from the endpoint 302 or other system components about system health, security, status, and so forth. A heartbeat may be encrypted or plaintext, or some combination of these, and may be communicated unidirectionally (e.g., from the endpoint 308 to the threat management facility 308) or bidirectionally (e.g., between the endpoint 302 and the server 306, or any other pair of system components) on any useful schedule. A suitable heartbeat system is described in greater detail below with reference to FIG. 6.

In general, these various monitoring and management systems may cooperate to provide improved threat detection and response. For example, the coloring system 310 may be used to evaluate when a particular process is potentially opening inappropriate files, and a potential threat may be confirmed based on an interrupted heartbeat from the heartbeat system 314. The key management system 312 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 4:
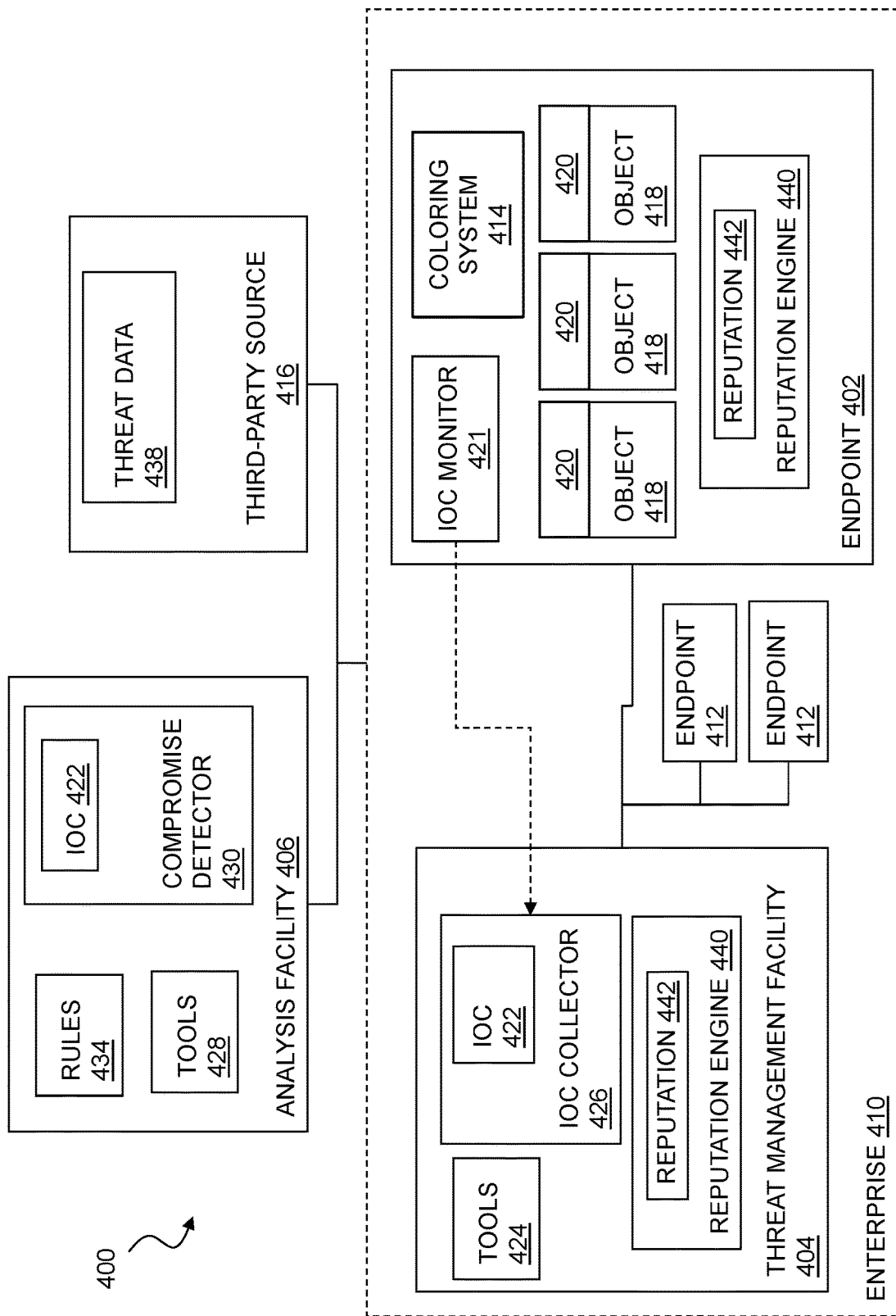
FIG. 4 illustrates a system for behavioral tracking, coloring, and generation of indications of compromise (IOCs).

FIG. 4 illustrates a system for behavioral tracking, coloring, and generation of indications of compromise (IOCs). In general, the system 400 may include a number of entities participating in a threat management process such as any of the entities and threat management processes described herein. The threat management process may for example employ techniques such as behavioral tracking, encryption, endpoint recording, reputation-based threat detection, behavioral-based threat detection, signature-based threat detection, and combinations of the foregoing, or any other suitable techniques for detecting threats to endpoints in an enterprise.

In general, the system 400 may include a number of endpoints 402, 412 and a threat management facility 404 in an enterprise 410, such as any of the enterprises described above. An external analysis facility 406 may analyze threat data and provide rules and the like for use by the threat management facility 404 and endpoints 402, 412 in managing threats to the enterprise 410. The threat management facility 404 may reside in a local appliance (e.g., embedded within, or locally coupled to the endpoint 402), a virtual appliance (e.g., which could be run by a protected set of systems on their own network systems), a private cloud, a public cloud, and so forth. The analysis facility 406 may store locally-derived threat information. The analysis facility 406 may also or instead receive threat information from a third party source 416 such as MITRE Corporation or any other public, private, educational or other organization that gathers information on network threats and provides analysis and threat detection information for use by others. Each of these components may be configured with suitable programming to participate in the various threat detection and management techniques contemplated herein. The threat management facility 404 may monitor any stream of data from an endpoint 402 exclusively, or use the full context of intelligence from the stream of all protected endpoints 402, 412 or some combination of these.

The endpoint 402 may be any of the endpoints described herein, or any other device or network asset that might join or participate in the enterprise 410 or otherwise operate on an enterprise network. This may, for example, include a server, a client such as a desktop computer or a mobile computing device (e.g., a laptop computer, a wearable device, a tablet, and the like), a cellular phone, a smart phone, or other computing device suitable for participating in the enterprise 410.

In general, the endpoint 402 may include any number of computing objects such as an object 418 labeled with a descriptor 420. While the term object has a number of specific meanings in the art, and in particular in object-oriented programming, it will be understood that the term 'object' as used herein is intended to be significantly broader, and may include any data, process, file or combination of these including without limitation any process, application, executable, script, dynamic linked library, file, data, database, data source, data structure, function, resource locator (e.g., uniform resource locator (URL) or other uniform resource identifier (URI)), or the like that might be manipulated by one of the computing devices described herein.

An object 418 may also or instead include a remote resource, such as a resource identified in a URL. That is, while the objects 418 in FIG. 4 are depicted as residing on the endpoint 402, an object 418 may also reside elsewhere in the system 400, while still being labeled with a descriptor 420 and tracked by the monitor 421 of the endpoint 402. The object 418 may be an item that is performing an action or causing an event, or the object 418 may be an item that is receiving the action or result of an event (i.e., the item in the system 400 being acted upon).

Where the object 418 is data or includes data, the object 418 may be encrypted or otherwise protected, or the object 418 may be unencrypted or otherwise unprotected. The object 418 may be a process or other computing object that performs an action, which may include a single event or a collection or sequence of events taken by a process. The object 418 may also or instead include an item such as a file or lines of code that are executable to perform such actions. The object 418 may also or instead include a computing component upon which an action is taken, e.g., a system setting (e.g., a registry key or the like), a data file, a URL, or the like. The object 418 may exhibit a behavior such as an interaction with another object or component of the system 400.

In one aspect, objects 418 may be described in terms of persistence. The object 418 may, for example, be a part of a process, and remain persistent as long as that process is alive. The object 418 may instead be persistent across an endpoint 402 and remain persistent as long as an endpoint 402 is active or alive. The object 418 may instead be a global object having persistence outside of an endpoint 418, such as a URL or a data store. In other words, the object 418 may be a persistent object with persistence outside of the endpoint.

Although many if not most objects 418 will typically be benign objects that may be found on a normal, operating endpoint, an object 418 may contain software associated with an advanced persistent threat (APT) or other malware that resides partially or entirely on the endpoint 402. The associated software may have reached the endpoint 402 in a variety of ways, and may have been placed manually or automatically on the endpoint 402 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 402. Further, the associated software may install from a file on the endpoint 402 (or a file remote from the endpoint 402), and the associated software may create one or more files such as data files or the like while executing. Associated software should be understood to generally include all such files and processes except where a specific file or process is more specifically noted.

A threat such as an APT may also take the form of an attack where no altered or additional software is directly added or modified on the endpoint 402. Instead, an adversary may reuse existing software on the system 400 to perform the attacks. It is for this reason that simply scanning for associated software may be insufficient for the detection of APTs and it may be preferable to detect APTs based on the behavior of the software and associated objects 418 that are used by, for, and with that software.

An object coloring system 414 may apply descriptors 420 to objects 418 on the endpoint 402. This may be performed continuously by a background process on the endpoint 402, or it may occur whenever an object 418 is involved in an action, such as when a process makes a call to an application programming interface (API) or takes some other action, or when a URL is used to initiate a network request, or when a read or a write is performed on data in a file. This may also or instead include a combination of these approaches as well as other approaches, such as by pre-labeling a file or application when it is moved to the endpoint 402, or when the endpoint 402 is started up or instantiated. In general, the object coloring system 414 may add, remove or change a color at any location and at any moment that can be practicably instrumented on a computer system.

As noted above, the term 'object' as used herein is intended to include a wide range of computing objects and as such, the manner in which particular objects 418 are labeled or 'colored' with descriptors 420 may vary significantly. Any object 418 that is performing an action (such as a process or application) may be colored at the time of and/or with a label corresponding to the action, or likewise any object 418 that is the target of the action (such as a file or other data) may be colored at the time that it is used and/or with a label corresponding to a process or the like using the object 418. Furthermore, the operating system runtime representation of the object 418 may be colored, or the persistent object outside of the operating system may be colored (as is the case for a File Handle or File Object within the operating system or the actual file as stored in a file system), such as within an encryption header or other header applied to the file, or as part of a directory attribute or any other persistent location within the file or file system. A former coloring may be ephemerally tracked while the operating system maintains the representation and the latter may persist long after any reboots of the same operating system and likewise have meaning when read or used by other endpoints 402. For processes, each file handle may be supplemented with a pointer or other mechanism for locating a descriptor 420 for a particular object 420 that is a process. More specifically, each object 418 may be colored in any manner suitable for appending information to that object 418 so that the corresponding descriptor 420 can be retrieved and, where appropriate, updated.

The coloring system 414 may apply any suitable rules for adding and changing descriptors 420 for objects 418. For example, when a process with a certain descriptor accesses data with a different descriptor, the descriptor for the process may be updated to correspond to the data, or the descriptor for the data may be updated to correspond to the process, or some combination of these. Any action by or upon an object 418 may trigger a coloring rule so that descriptors 420 can be revised at any relevant time(s) during processing.

In one aspect, colors will not explicitly indicate a compromised security state or other good/bad types of distinctions (although they may be adapted to this use). Instead, colors may record some known information or understanding about an object 418, such as a source, a purpose, and so forth. In this context, colors will not be used to label actual or potential security compromises, but to identify inconsistencies among interacting objects 418, and to restrict or control access and use accordingly. For example, where an endpoint uses file-system-based encryption as described herein, a process that is colored as exposed to external resources (e.g., the Internet) may be prohibited from accessing cleartext data for protected files. Colors can also be used in other contexts such as intrusion prevention, routing rules, and detection of odd or questionable behavior.

In one aspect, colors may be implemented as flags associated with objects 418 that provide a short hand cache of potentially relevant information. While this information could also be obtained for an object 418 through a careful inspection of related activity logs or other data recording activities, the use of a cache of flags for coloring information makes the coloring information directly available and immediately actionable, as distinguished from post hoc forensic activities that are otherwise supported by data logging.

In one aspect, colors as contemplated herein may fall into two different categories: static colors and dynamic colors. Static colors may be explicitly applied based on, e.g., a controlling application. For example, a static color may specify a status of an application or data, or an associated type of application (e.g., productivity, mail client, messaging, browser, word processing, financial, spreadsheet, etc.). In this context, a process will generally inherit static colors from a source executable, and will permit inferences for appropriate behavior and related processes. Dynamic colors may be assigned based on direct observation of executing processes, and may not be inherited or transferred among processes (although the presence of a dynamic color may be used to draw another coloring inference upon interaction with another process). Thus the inheritance of colors may depend in part upon the type of color that is applied, or upon explicit inheritance rules provided for a particular color.

A descriptor 420 may take a variety of forms, and may in general include any information selected for relevance to threat detection. This may, for example, be a simple categorization of data or processes such as trusted or untrusted. For example, in one embodiment described herein, data and processes are labeled as either 'IN' (e.g., trusted) or 'OUT' (e.g., untrusted). The specific content of the label is unimportant, and this may be a binary flag, text string, encrypted data or other human-readable and/or machine-readable identifier, provided that the descriptor 420 can facilitate discrimination among labeled files—in this example, between trusted objects 418 and untrusted objects 418 so that, e.g., trusted data can be selectively decrypted or encrypted for use with trusted processes. Similarly, data may be labeled as corporate data or private data, with similar type-dependent processing provided. For example, private data may be encrypted with a key exclusively controlled by the data owner, while corporate data may be encrypted using a remotely managed key ring for an enterprise operated by the corporation.

In another aspect, the descriptor 420 may provide a multi-tiered or hierarchical description of the object 418 including any information useful for characterizing the object 418 in a threat management context. For example, in one useful configuration the descriptor 420 may include a type or category, static threat detection attributes, and an explicit identification. The type or category for the object 418 may be any category or the like that characterizes a general nature or use of the object 418 as inferred from behavior and other characteristics. This may, for example, include categories such as 'game,' 'financial,' 'application,' 'electronic mail,' 'image,' 'video,' 'browser,' 'antivirus,' and so forth. The category may be more granular, or may include hierarchical categories such as 'application:spreadsheet,' 'application:word processing,' and so forth. Such colors may be directly inferred from a single action, a sequence of actions, or a combination of actions and other colors, including, e.g., colors of processes and files related to a particular action, or other objects 418 that provide context for a particular action or group of actions. One or more colors may also or instead be explicitly provided by a user or a process, or otherwise automatically or manually attributed to computer objects as contemplated herein.

The static threat detection attributes may be any readily ascertainable characteristics of the object 418 useful in threat detection. This may, for example, include an antivirus signature, a hash, a file size, file privileges, a process user, a path or director, and so forth. Static threat detection attributes may also include attributes that are derived by or supplied from other sources. For example, static threat detection attributes may include a reputation for an object 418, which may be expressed in any suitable or useful level of granularity such as with discrete categories (trusted/untrusted/unknown) or with a numerical score or other quantitative indicator. The explicit identification may, in general, be what an object 418 calls itself, e.g., a file name or process name.

Some actions may transfer colors from the subject of the action to the target of the action. For example, when a process creates sub-processes, the sub-processes may inherit the colors of its parent(s). By way of another example, when a process is initially loaded from an executable, it may inherit the color(s) stored in the file system for or with the executable.

In general, the descriptor 420 may be provided in any suitable format. The descriptor 420 may for example be formed as a vector of binary flags or other attributes that form the 'color' or description of an object 418. The descriptor 420 may also, where appropriate, include scalar quantities for certain properties. For example, it may be relevant how many times a system file was accessed, how many file handles a process has open, how many times a remote resource was requested or how long a remote resource is connected, and this information may be suitably encoded in the descriptor 420 for use in coloring objects with the coloring system 414 and applying rules for IOC detection by the IOC monitor 421.

An indication of compromise (IOC) monitor 421 may be provided to instrument the endpoint 402 so that any observable actions by or involving various objects 418 can be detected. As with the coloring system 414, it will be understood that the types of observable actions will vary significantly, and the manner in which the endpoint 402 is instrumented to detect such actions will depend on the particular type of object 418. For example, for files or the like, an API for a file system may be used to detect reads, writes, and other access (e.g., open, read, write, move, copy, delete, etc.), and may be configured to report to or otherwise initiate monitoring of the action taken with the file through the file system. As another example, kernel objects may be instrumented at the corresponding object handle or in some other manner. As a further example, a kernel driver may be used for intercepting a process startup. While a wide variety of objects are contemplated herein, one of ordinary skill in the art may readily create suitable instrumentation for any computing object so that it may be monitored by the IOC monitor 421.

It will be noted that suitable instrumentation may be created for a variety of functions and circumstances. For example, instrumentation may usefully track requests for network access or other actions back to a particular application or process, or data payloads back to a particular file or data location. One of ordinary skill in the art can readily implement suitable traces and/or logging for any such information that might be useful in a particular IOC monitoring operation.

In general, the IOC monitor 421 applies rules to determine when there is an IOC 422 suitable for reporting to a threat management facility 404. It will be understood that an endpoint 402 may, in suitable circumstances and with appropriate information, take immediate local action to remediate a threat. However, the monitor 421 may advantageously accumulate a sequence of actions, and still more advantageously may identify inconsistencies or unexpected behavior within a group of actions with improved sensitivity by comparing descriptors 420 for various objects 418 involved in relevant actions and events. In this manner, rules may be applied based upon the descriptors 420 that better discriminate malicious activity while reducing the quantity and frequency of information that must be communicated to a remote threat management facility 404. At the same time, all of the relevant information provided by the descriptors 420 can be sent in an IOC 422 when communicating a potential issue to the threat management facility 404. For example, during the course of execution, a specific process (as evidenced by its observed actions) may be assigned color descriptors indicating that it is a browser process. Further, the specific process may be assigned an attribute indicating that it has exposed itself to external URLs or other external data. Subsequently, the same process may be observed to be taking an action suitable for an internal or system process, such as opening up shared memory to another process that has coloring descriptions indicating that it is a system process. When this last action is observed, an inconsistency in the various color descriptors between the subject of the action—the externally exposed browser process—and the target of the action may result in a well-defined IOC, which may be directly processed with immediate local action taken. The IOC may also or instead be reported externally as appropriate.

Thus, an endpoint 402 in an enterprise 410 may be instrumented with a coloring system 414 and monitor 421 to better detect potentially malicious activity using descriptors 420 that have been selected for relevance to threat detection along with a corresponding set of rules developed for the particular descriptors 420 that are being used to label or color various objects 418. By way of example, the object 418 may be a web browser that starts off being colored as a 'browser' and an 'internet facing' application. Based on this descriptor 420, a range of behaviors or actions may be considered normal, such as accessing remote network resources. However, if an object 418 colored with this descriptor 420 attempted to elevate privileges for a process, or to access a registry or system files, then this inconsistency in action may trigger a rule violation and result in an IOC 422.

In general, any action or series of actions that cumulatively invoke a particular reporting or action rule may be combined into an IOC 422 and communicated to the threat management facility 404. For example, an IOC 422 may include a malicious or strange behavior, or an indication of a malicious or strange behavior. The IOC 422 may be a normalized IOC that expresses one or more actions in a platform independent manner. That is, the IOC 422 may express a malicious behavior or suspected malicious behavior without reference to platform-specific information such as details of an operating system (e.g., iOS, MacOS, Windows, Android, Linux, and so forth), hardware, applications, naming conventions, and so forth. Thus, a normalized IOC may be suitable for identifying a particular threat across multiple platforms, and may include platform independent processes, actions, or behaviors, or may express such process, actions, or behaviors in a platform independent manner. The normalized IOC may be generated from the IOC 422, e.g., it may be a converted version of the IOC 422 suitable for use with multiple platforms, or it may simply be any IOC 422 that has been created in a platform independent form. Process colorization (i.e., using the coloring system 414) as described herein may be used to create a normalized IOC.

In general, a threat management facility 404 for the enterprise 410 may include an IOC collector 426 that receives the IOC 422 from the endpoint 402 and determines an appropriate action. This may include any suitable remedial action, or where one or more IOCs 422 are inconclusive, continued monitoring or increased monitoring as appropriate.

The threat management facility 404 may provide a variety of threat management or monitoring tools 424, any of which may be deployed in response to IOCs 422 collected by the IOC collector 426. These tools 424 may include without limitation a scanning engine, whitelisting/blacklisting, reputation analysis, web filtering, an emulator, protection architecture, live protection, runtime detection, APT detection, network antivirus products, IOC detection, access logs, a heartbeat, a sandbox or quarantine system, and so forth.

The analysis facility 406 may provide a remote processing resource for analyzing malicious activities and creating rules 434 suitable for detecting IOCs 422 based on objects 420 and descriptors 420. It is generally contemplated that suitable attributes of certain descriptors 418 and one or more rules 434 may be developed together so that objects 418 can be appropriately labeled with descriptors 420 that permit invocation of rules 434 and creation of IOCs 422 at appropriate times. The analysis facility 406 may include a variety of analysis tools 428 including, without limitation, tools for regular expression, whitelisting/blacklisting, crowd sourcing, identifiers, and so forth. The analysis tools 428 may also or instead include information and tools such as URL look-ups, genotypes, identities, file look-up, reputations, and so forth. The analysis facility 406 may also provide numerous related functions such as an interface for receiving information on new, unknown files or processes, and for testing of such code or content in a sandbox on the analysis facility 406.

The analysis facility 406 may also or instead include a compromise detector 430, where the compromise detector 430 is configured to receive new threat information for analysis and creation of new rules and descriptors as appropriate, as well as corresponding remedial actions. The compromise detector 430 may include any tools described herein or otherwise known in the art for detecting compromises or evaluating new threats in an enterprise 410.

In general, a rule 434 may be manually created with corresponding human-readable semantics, e.g., where a process is labeled as a browser process or other category or type that can be interpreted by a human. It should, however, be appreciated that the compromise detector 430 may also be configured to automatically generate descriptors 420 and rules 434 suitable for distribution to a threat management facility 404 and an endpoint 402. In this latter mode, the meaning of a particular descriptor 420 may not have a readily expressible human-readable meaning. Thus, it will be understood that attributes selected for relevance to threat detection may include conventional attributes, as well as attributes without conventional labels or meaning except in the context of a particular, computer-generated rule for threat detection.

In general, the analysis facility 406 may be within an enterprise 410, or the analysis facility 406 may be external to the enterprise 410 and administered, for example, by a trusted third party. Further, a third-party source 416 may provide additional threat data 438 or analyses for use by the analysis facility 406 and the threat management facility 404. The third-party resource 416 may be a data resource that provides threat data 438 and analyses, where the threat data 438 is any data that is useful in detecting, monitoring, or analyzing threats. For example, the threat data 438 may include a database of threats, signatures, and the like. By way of example, the third-party resource 416 may be a resource provided by The MITRE Corporation.

The system 400 may include a reputation engine 440 storing a plurality of reputations 442. The reputation engine 440 may include a reputation management system for the generation, analysis, identification, editing, storing, etc., of reputations 442. The reputation engine 440 may include reputation-based filtering, which may be similar to the reputation filtering discussed above with reference to FIG. 1. The reputation engine 440 may be located on the threat management facility 404 or the endpoint 402 as shown in FIG. 4, or the reputation engine 440 may be located elsewhere in the system 400. The reputation engine 440 may receive an IOC 422 or a stream of IOCs 422, and may generate or utilize reputations 442 for the IOCs 422. The reputation engine 440 may also or instead receive actions, behaviors, events, interactions, and so forth, and may generate or utilize reputations 442 for any of the foregoing. The reputation engine 440 may generate or revise a reputation 442 based on behaviors, actions, events, interactions, IOCs 422, other reputations 442, a history of events, data, rules, state of encryption, colors, and so forth. The reputation engine 440 may utilize a third-party resource, e.g., for the third-party resource's reputation data.

The reputations 442 may include reputations for any of the objects 418 as described herein. In general, the reputations 442 may relate to the trustworthiness of the objects 418 or an attribute thereof (e.g., the source of the object 418, a behavior of the object 418, another object interacting with the object 418, and so forth). The reputations 442 may include lists of known sources of malware or known suspicious objects 418. The reputations 442 may also or instead include lists of known safe or trusted resources or objects 418. The reputations 442 may be stored in a reputations database included on the reputation engine 440 or located elsewhere in the system 400. The reputations 442 may be expressed in any suitable or useful level of granularity such as with discrete categories (e.g., trusted, untrusted, unknown, malicious, safe, etc.) or with a numerical score or other quantitative indicator. The reputations 442 may also be scaled.

In general, in the system 400 of FIG. 4, a malicious activity on the endpoint 402 may be detected by the IOC monitor 421, and a corresponding IOC 422 may be transmitted to the threat management facility 404 for remedial action as appropriate. The threat management facility 404 may further communicate one or more IOCs 422 to the analysis facility 406 for additional analyses and/or resolution of inconclusive results. Other details and variations are provided below. While the use of coloring and IOCs as contemplated herein can improve threat detection and remediation in a number of ways, the system 400 can be further improved with granular control over access to endpoint data using an encryption system. A system for key-based management of processes and files on an endpoint is now discussed in greater detail.

Figure 5:
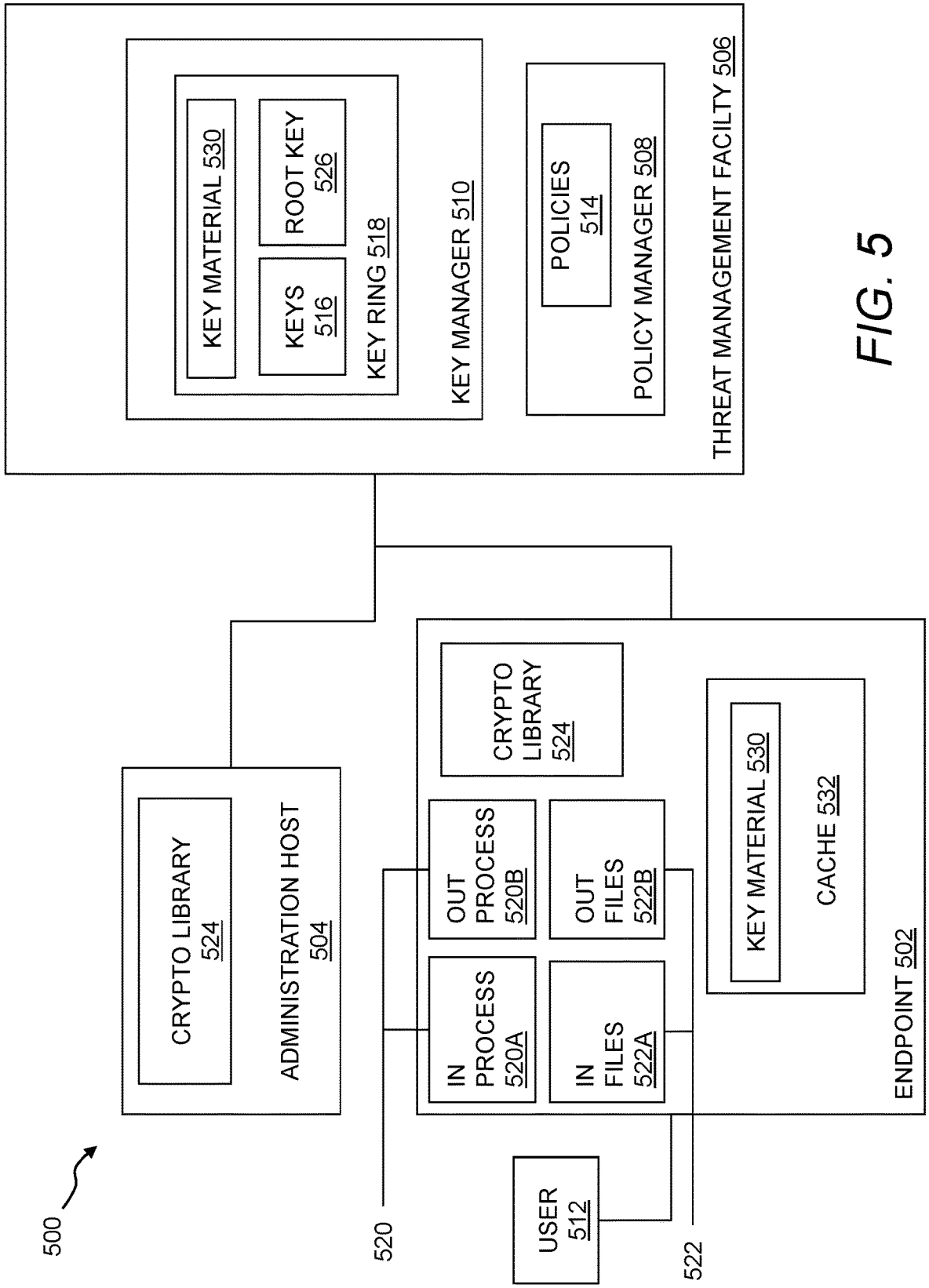
FIG. 5 illustrates a system for encryption management.

FIG. 5 illustrates a system for encryption management. Generally, the system 500 may include endpoints 502, an administration host 504, and a threat management facility 506, which may include policy manager 508 and key manager 510. The system 500 may provide for the management of users 512, policies 514, keys 516 (e.g., disposed on key rings 518), and endpoints 502 (e.g., from the administration host 504). The system 500 may utilize various storage and processing resources, which may be disposed in a cloud or the like.

The endpoints 502 may be any of the endpoints as described herein, e.g., with reference to the other figures. The endpoints 502 may also or instead include other end user devices and other devices to be managed. The endpoints 502 may include a web browser for use by the users 512, with supporting cryptographic functions implemented using cryptographic libraries in the web browser. The endpoints 502 may communicate with the other components of the system 500 using any suitable communication interface, which may include Secure Socket Layer (SSL) encryption, Hypertext Transfer Protocol Secure (HTTPS), and so forth for additional security.

The endpoints 502 may include objects as described herein. For example, the endpoints 502 may include processes 520 and files 522. The processes 520 may be labeled (e.g., by a coloring system using descriptors as described above) in such a manner that the process is 'IN,' where the process 520 is in compliance with policies 514 administered for the endpoint 502 from a remote threat management facility 506, or the process is 'OUT,' where the process 520 is out of compliance with a policy (or a number of policies) in the policies 514 for an enterprise. This may provide IN processes 520A and OUT processes 520B as shown in FIG. 5. The files 522 may be similarly labeled by a coloring system with descriptors that identify each file 522 as IN, where the file 522 complies with the policies 514 and is accordingly encrypted using, e.g., a remotely managed key ring 518, or the file is OUT, where the file 522 does not conform to the policies 514 and is accordingly not encrypted using the remotely managed key ring 518. This may provide IN files 522A and OUT files 522B as shown in FIG. 5. One skilled in the art will recognize that other objects of the endpoint 502 or other components of the system 500 may be labeled in a similar manner where they are either IN or OUT. By coloring objects in this manner and basing key access on the corresponding color, the "IN" software objects may operate in a protected environment that objectively appears to be in compliance with the policies 514. Other files and processes may still be used on the endpoint 502, but they will operate in an "OUT" or unprotected environment that cannot obtain access to any of the "IN" content or functionality.

In an implementation, the system 500 may include determining whether an endpoint 502 is IN or OUT or whether a component of the endpoint 502 is IN or OUT, which may be based upon a set of rules (e.g., the rules outlined herein) or policies such as the policies 514 described herein. In some aspects, if the entire endpoint 502 is OUT—that is, out of compliance with one or more policies 514, the endpoint 502 will not have key access or access to any protected content. Conversely, if the endpoint 502 is IN, the endpoint 502 may have access to protected content. Thus in one aspect, the notion of IN/OUT may be applied at an endpoint level, and data protection may be a consequence of endpoint protection. Endpoint protection may also or instead be applied at a more granular level, e.g., by determining whether executables, processes 520, files 522, etc., on the endpoint 502 are IN or OUT, which may be based upon rules or policies 514 as described herein.

The administration host 504 may include a web browser, which may include a cryptography library 524 and a web user interface (e.g., HTML, JavaScript, etc.). An administrator may utilize the web user interface to administer a key management system and perform administrative functions such as creating and distributing keys 516, establishing security policies, creating key hierarchies and rules, and so forth. The endpoint 502 may also include a cryptographic library 524 implementing cryptographic protocols for using key material in the key ring 518 to encrypt and decrypt data as needed.

The threat management facility 506 may include any of the threat management facilities or similar systems described herein. In general, the threat management facility 506 may include a policy manager 508 and key manager 510. Alternatively, one or more of the policy manager 508 and key manager 510 may be located elsewhere on a network.

The policy manager 508 may implement one or more policies 514, and maintain, distribute, and monitor the policies for devices in an enterprise. The policies 514 may include any policies 514 relating to secure operation of endpoints 502 in an enterprise. This may, for example, include hardware configuration policies, software configuration policies, communication policies, update policies, or any other policies relating to, e.g., the configuration of an endpoint 502, communications by an endpoint 502, software executing on an endpoint 502 and so forth. Policies 514 may include usage criteria based on, e.g., signatures, indications of compromise, reputation, user identity, and so forth. With respect to the key management system contemplated herein, the policies 514 may include a cryptographic protocol design, key servers, user procedures, and other relevant protocols, or these cryptographic protocols may be provided elsewhere for use by the policy manager 508. The policies 514 may also include any rules for compliance including those mentioned above or any other suitable rules or algorithms that can be applied to determine whether objects and components are 'IN' or 'OUT' as contemplated herein.

The key manager 510 may be part of the threat management facility 506, or it may be remotely managed elsewhere, e.g., in a remote cloud resource or the like. The key manager 510 may also or instead be disposed on the administration host 504 and one or more endpoints 502 in a manner independent of the threat management facility 506. In this manner, all cryptographic operations may be isolated from the threat management facility 506 and instead may be performed by a web browser or the like executing on the administration host 504 or an endpoint 502. The key manager 510 may manage the keys 516, including managing the generation, exchange, storage, use, and replacement of keys 516. The key manager 510 may include a key ring 518, where the keys 516 are disposed on the key ring 518 using one root key 526. The key manager 510 may also or instead include a variety of key management and other secure processes, including without limitation, administrator registration, establishing trust to endpoints 502, key distribution to endpoints 502, policy deployment, endpoint status reporting, and local key backup.

The users 512 may have full access to encrypted data. Alternatively, the users 512 may have limited access to encrypted data, or no access to encrypted data. Access may be limited to users 512 using endpoints 502 that are deemed 'IN' by the system, as well as to processes 520 that are IN, as further described herein.

The keys 210 may include cryptographic keys in a cryptosystem, i.e., decryption keys. In one aspect, the keys 210 may be disposed on one key ring 218 using one root key 220. In general, the keys 210 may be created and managed using, e.g., symmetric key technology, asymmetric key technology, or any other key technology or combination of key technologies suitable for securing data in an enterprise including, for example the Data Encryption Standard (DES), Triple DES, Advanced Encryption Standard (AES), and so forth. The cryptosystem may also or instead include any suitable public key infrastructure or the like supporting the distribution and use of keys for encryption, digital signatures, and so forth.

The key ring 518 may facilitate simplified management of the system 500. For example, by reducing the data protection system down to a single key ring 518, the system can eliminate or reduce the overhead for management of keys 516. In one aspect, all of the data on a key ring 518 is protected by one root key 526. By reducing the data protection system down to a single key ring 518 protected by one root key 526, all privileged users 512 on uncompromised platforms can have access to all protected data. In this embodiment, data is either 'IN' (i.e., encrypted), or it's 'OUT' (i.e., not encrypted). In one aspect, the default system does not include any additional shade of access control.

The cryptography library 524 may be disposed on the administration host 504 as shown in FIG. 5. The cryptography library 524 may also be disposed on the endpoint 502, e.g., in a web browser, or it may be disposed on another component of the system 500, or any combination of these. The cryptographic library 524 may be installed by an administrator. In general, key material 530 from the key ring 518 may be stored in a cache 532 on the endpoint 502 within any suitable memory on the endpoint 502 for use in encryption and decryption as contemplated herein. As noted above, an enterprise that systematically uses coloring and indications of compromise can be improved through the use of a key management system as contemplated herein. This system may be still further improved with the addition of a heartbeat system that communicates heartbeats from an endpoint containing health and status information about the endpoint. A suitable heartbeat system is now described in greater detail.

Figure 6:
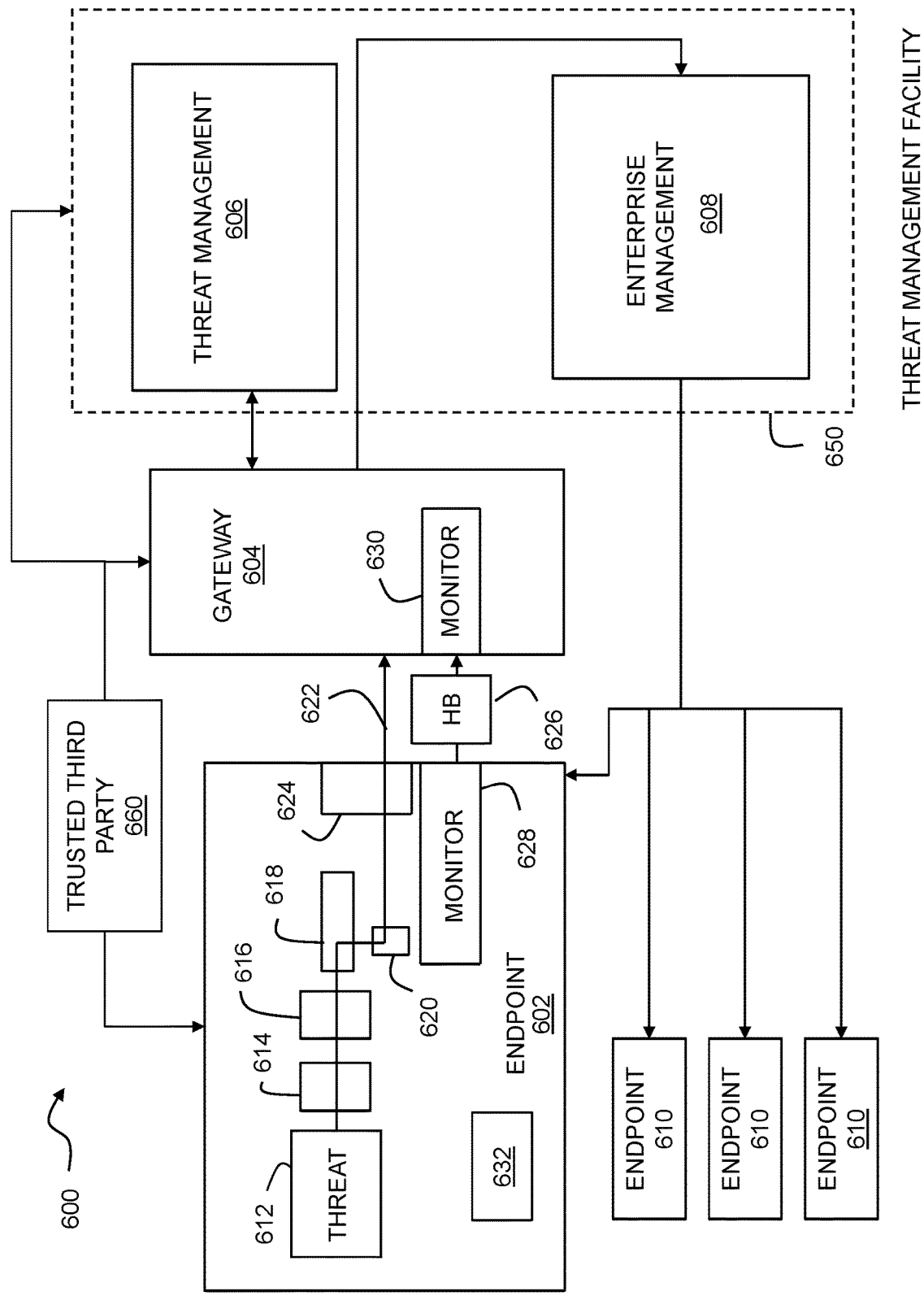
FIG. 6 illustrates a threat management system using heartbeats.

FIG. 6 illustrates a threat management system using heartbeats. In general, a system 600 may include an endpoint 602, a gateway 604, a threat management system 606, and an enterprise management system 608 that manages an enterprise including the endpoint 602, the gateway 604, and one or more additional endpoints 610. Each of these components may be configured with suitable programming to participate in the detection and remediation of an advanced persistent threat (APT) or other malware threat as contemplated herein. Although the term "gateway" is used for the device between an endpoint and an external network, it will be appreciated that this device may also or instead include a switch, router, firewall, and/or other network elements, any of which may be included in the "gateway" as that term is used herein.

The endpoint 602 may be any of the endpoints described herein, or any other device or network asset that might join or participate in an enterprise network. The endpoint 602 may contain a threat 612 such as an advanced persistent threat, virus, or similar malware that resides on the endpoint 602. The threat 612 may have reached the endpoint 602 in a variety of ways, and may have been placed manually or automatically on the endpoint 602 by a malicious source. It will be understood that the threat 612 may take any number of forms and have any number of components. For example, the threat 612 may include an executable file that can execute independently, or the threat 612 may be a macro, plug-in, or the like that executes within another application. Similarly, the threat 612 may manifest as one or more processes or threads executing on the endpoint 602. The threat 612 may install from a file on the endpoint 602 or a file remote from the endpoint 602, and the threat 612 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or enterprise unless a more specific threat or threat type is explicitly provided or otherwise clear from the context.

The threat 612 may be analyzed by one or more threat countermeasures on the endpoint 602 such as a whitelisting filter 614 that approves each item of code before executing on the endpoint 602 and prevents execution of non-whitelisted code. The endpoint 602 may also include an antivirus engine 616 or other malware detection software that uses any of a variety of techniques to identify malicious code by reputation or other characteristics. A runtime detection engine 618 may also monitor executing code to identify possible threats. More generally, any of a variety of threat detection techniques may be applied to the threat 612 before and during execution. In general, a threat 612 may evade these and other security measures and begin executing as a process 620 on the endpoint 602.

Network traffic 622 from the process 620 may be monitored and logged by a traffic monitor 624 on the endpoint 602. The traffic monitor 624 may, for example, log a time and a source of each network request from the endpoint 602. Where the endpoint 602 is within an enterprise network, the network traffic 622 may pass through the gateway 604 in transit to a data network such as the Internet. While the gateway 604 may be logically or physically positioned between the endpoint 602 and an external data network, it will be understood that other configurations are possible. For example, where the endpoint 602 is associated with an enterprise network but operating remotely, the endpoint 602 may form a VPN or other secure tunnel or the like to the gateway 604 for use of a threat management system 606, enterprise management system 608, and any other enterprise resources.

The endpoint 602 may use a heartbeat 626 to periodically and securely communicate status to the gateway 604. The heartbeat 626 may be created by a health monitor 628 within the endpoint 602, and may be transmitted to a remote health monitor 630, for example, at the gateway 604. The health monitor 628 may monitor system health in a variety of ways, such as by checking the status of individual software items executing on the endpoint 602, checking that antivirus and other security software is up to date (e.g., with current virus definition files and so forth) and running correctly, checking the integrity of cryptographic key stores, checking for compliance with enterprise security policies, and checking any other hardware or software components of the endpoint 602 as necessary or helpful for health monitoring. The health monitor 628 may thus condition the issuance of a heartbeat 626 on a satisfactory status of the endpoint 602 according to any suitable criteria, enterprise polices, and other evaluation techniques. The remote health monitor 630 may also or instead be provided at the threat management facility 650, for example as part of the threat management system 606 or the enterprise management system 608.

The heartbeat 626 may be secured in any suitable manner so that the health monitor 630 can reliably confirm the source of the heartbeat 626 and the status of the endpoint 602. To this end, the heartbeat 626 may be cryptographically signed or secured using a private key so that the monitor 630 can authenticate the origin of the heartbeat 626 using a corresponding public key. In one aspect, the heartbeat 626 may include a combination of plaintext information and encrypted information, such as where the status information for the endpoint is provided in plaintext while a digital signature for authentication is cryptographically secured. In another aspect, all of the information in the heartbeat 626 may be encrypted.

In one aspect, a key vault 632 may be provided on the endpoint to support cryptographic functions associated with a secure heartbeat. An obfuscated key vault 632 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 632, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

A robust heartbeat 626 may usefully provide defensive mechanisms against reverse engineering of obfuscated content (e.g., the private key material stored in key vault 632, the code used to validate the correct running of the remainder of the systems as part of the heartbeat 626 code itself) and any anti-lifting protections to prevent malware from directly using the endpoint 602 (or the health monitor 628 on the endpoint 602) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 626 code itself.

A variety of useful techniques may be employed to improve security of the key vault 632 and the heartbeat 626. For example, the system may use domain shifting so that original key material is inferred based on hardware and software properties readily available to the key vault 632, and to ensure that key material uses non-standard or varying algorithms. Software properties may, for example, include readily determined system values such as hashes of nearby code. In another aspect, the keys may be domain shifted in a manner unique to the endpoint 602 so that the manner of statistical validation of call stacks and core software is unique to the endpoint 602. Further the key vault may be provisioned so that a public key stored in the key vault 632 is signed with a certificate (or into a certificate chain) that can be externally validated by a network appliance or other trusted third party or directly by the health monitor.

The heartbeat 626 may encode any useful status information, and may be transmitted from the endpoint 602 on any desired schedule including any periodic, aperiodic, random, deterministic, or other schedule. Configured in this manner, the heartbeat 626 can provide secure, tamper-resistant instrumentation for status of the endpoint 602, and in particular an indication that the endpoint 602 is online and uncompromised. A disappearance of the heartbeat 626 from the endpoint 602 may indicate that the endpoint 602 has been compromised; however this may also simply indicate that the endpoint 602 has been powered off or intentionally disconnected from the network. Thus, other criteria may be used in addition to the disappearance or interruption of the heartbeat 626 to more accurately detect malicious software. Some such techniques are described below, but it will be understood that this may include any supplemental information that might tend to make an attack on the endpoint 602 more or less likely. For example, if the heartbeat 626 is interrupted but the endpoint 602 is still sourcing network traffic, then an inference might suitably be made that the endpoint 602 is compromised.

The threat management system 606 may, in general, be any of the threat management systems described herein. The enterprise management system 608 generally provides tools and interfaces for administration of the enterprise and various endpoints 610 and other resources or assets attached thereto. It will be understood that, the functions of the threat management system 606 and the enterprise management system 608 may vary, and general threat management and administration functions may be distributed in a variety of ways between and among these and other components. This is generally indicated in FIG. 6 as a threat management facility 650 that includes the threat management system 606 and the enterprise management system 608. It will be understood that either or both of these system may be administered by third parties on behalf of the enterprise, or managed completely within the enterprise, or some combination of these, all without departing from the scope of this disclosure. It will similarly be understood that a reference herein to a threat management facility 650 is not intended to imply any particular combination of functions or components, and shall only be understood to include such functions or components as explicitly stated in a particular context, or as necessary to provide countermeasures for advanced persistent threats as contemplated herein. It also should be understood that the heartbeat may be monitored and/or managed by the threat management system 606, the enterprise management system 608, or another component of the threat management facility 650.

The system 600 may include a certificate authority 660 or similar trust authority or the like (shown as a "trusted third party" in the figure). In order to provide a meaningfully secure heartbeat 626, the heartbeat 626 may be secured with reference to a trusted authority such as a certificate authority 660 that can issue cryptographic certificates allowing other entities to rely on assertions about identity (e.g., by enabling verification with a trusted third party), and to enable cryptographically secure communications. The cryptographic techniques for creating and using such certificates and relationships are well known, and are not repeated here. The certificate authority 660 may be administered by the enterprise management system 608 or some other internal resource of the enterprise, or the certificate authority 660 may be administered by a trusted third party such as any of a variety of commercially available certificate authorities or the like. Thus, the certificate authority 660, or some other similar cloud service or the like, may operate as a security broker to register, e.g., endpoints 602, 610, the gateway 604, the threat management facility 650, and so forth, and provide cryptographic material for each of the other trusting entities to securely communicate with one another.

Once registered with the certificate authority 660 in this fashion, the heartbeat may be used to establish trust between the endpoint 602 and other entities, and to validate the source of the heartbeat 626 when it is received. More generally, a heartbeat 626 secured in this manner may provide an encrypted channel between network entities such as an endpoint 602 and the gateway 604 (or a firewall or the like). The nature of the communication may provide a technique for validating the source, as well as obfuscating the contents with encryption. Thus when, for example, the endpoint 602 provides information about a good/healthy state or a bad/compromised state, the recipient may rely on this state information and act accordingly.

Figure 7:
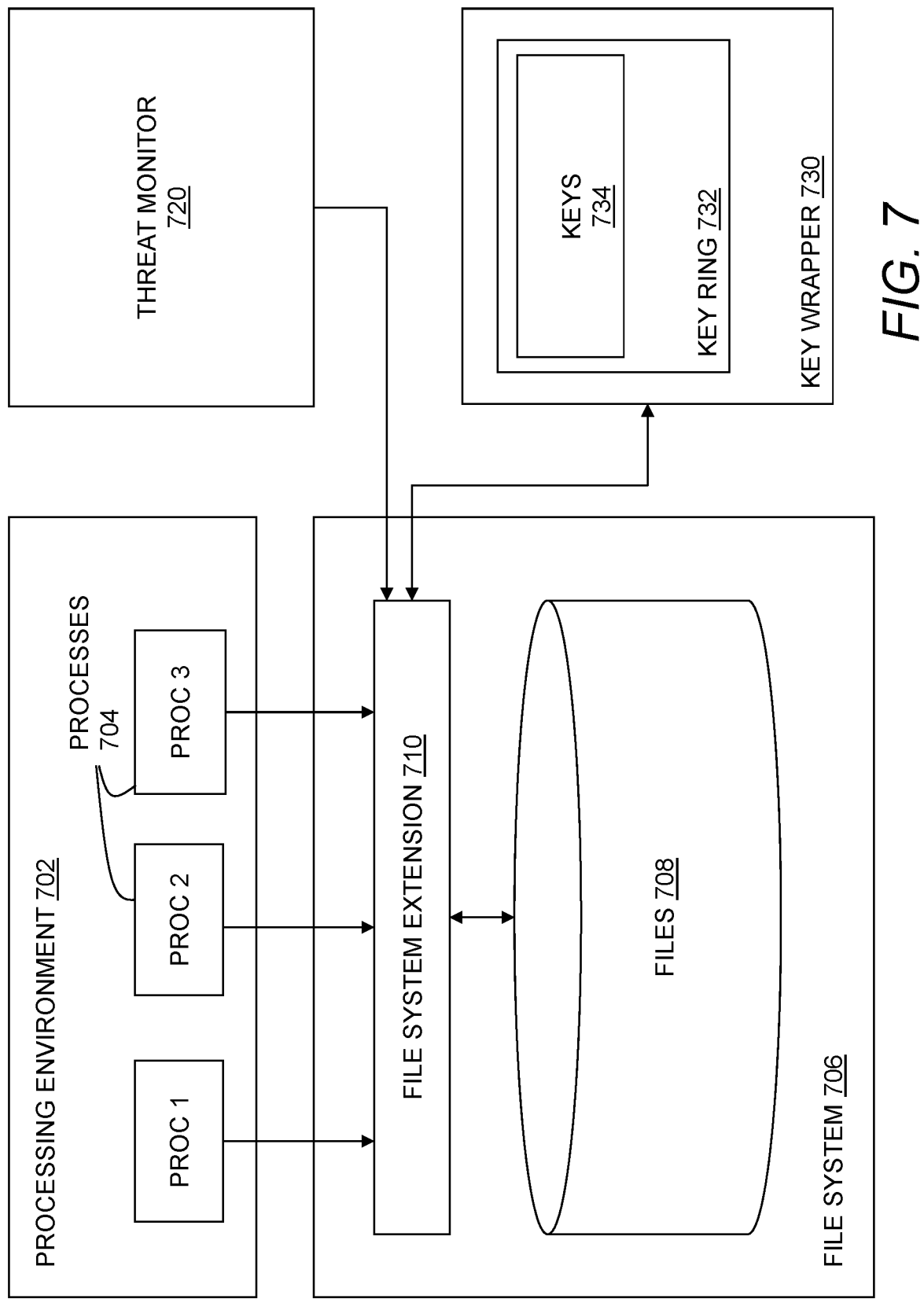
FIG. 7 shows an architecture for endpoint protection in an enterprise network security system.

FIG. 7 shows an architecture for endpoint protection in an enterprise network security system. In general, an endpoint may include a processing environment 702, a file system 706, a threat monitor 720 and a key wrapper 730.

The processing environment 702 may, for example, be any environment such as an operating system or the like suitable for executing one or more processes 704.

Each process 704 may be an instance of a computer program, portion of a computer program or other code executing within the processing environment 702. A process 704 may execute, e.g., on a processor, group of processors, or other processing circuitry or platform for executing computer-executable code. A process 704 may include executable computer code, as well as an allocation of memory, file descriptors or handles for data sources and sinks, security attributes such as an owner and any associated permissions, and a context including the content of physical memory used by the process 704. More generally, a process 704 may include any code executing on an endpoint such as any of the endpoints described herein.

The file system 706 is generally associated with an operating system that provides the processing environment 702, and serves as an intermediary between processes 704 executing in the processing environment 702 and one or more files 708 stored on the endpoint. The file system 706 may provide a directory structure or other construct to facilitate organization of the files 708, and the file system 706 generally supports file functions such as creating, deleting, opening, closing, reading, writing, and so forth.

An extension 710 may be included in the file system 706 by modifying the operating system kernel. While other programming techniques may be employed to perform the functions of an extension 710 as contemplated herein, direct modifications of or additions to the operating system permit the extension 710 to operate transparently to the processing environment 702 and the processes 704 without requiring any modifications or adaptations. The extension 710 may, for example, be implemented as a file system filter (in a MICROSOFT WINDOWS environment) or a mount point to a directory (in an APPLE iOS environment). The extension 710 to the files system as contemplated herein performs two concurrent functions. First, the extension 710 communicates with a threat monitor 720 in order to receive updates on the security status and exposure status of the processes 704 or the endpoint. Second the extension 710 communicates with a key wrapper 730 that provides key material for encrypting and decrypting data in the files 708. Finally, the extension 710 operates to conditionally provide encryption and decryption of the files 708 for the processes 704 based on a current security or exposure state, as described in greater detail below.

The threat monitor 720 may include any suitable threat monitoring, malware detection, antivirus program or the like suitable for monitoring and reporting on a security state of an endpoint or individual processes 704 executing thereon. This may include local threat monitoring using, e.g., behavioral analysis or static analysis. The threat monitor 720 may also or instead use reputation to evaluate the security state of processes 704 based on the processes 704 themselves, source files or executable code for the processes 704, or network activity initiated by the processes 704. For example, if a process 704 requests data from a remote URL that is known to have a bad reputation, this information may be used to infer a compromised security state of the endpoint. While a threat monitor 720 may operate locally, the threat monitor 720 may also or instead use remote resources such as a gateway carrying traffic to and from the endpoint, or a remote threat management facility that provides reputation information, malware signatures, policy information and the like for the endpoint and other devices within an enterprise such as the enterprise described above.

In general, the threat monitor 720 provides monitoring of a security state and an exposure state of the endpoint. The security state may, for example, be 'compromised', 'secure', or some other state or combination of states. This may be based on detections of known malware, suspicious activity, policy violations and so forth. The exposure state may be 'exposed' or 'unexposed', reflecting whether or not a particular process 704 or file 708 has been exposed to potentially unsafe content. Thus exposure does not necessarily represent a specific threat, but the potential for exposure to unsafe content. This may be tracked in a variety of ways, such as by using the coloring system described above with reference to FIG. 5.

The key wrapper 730 may contain a key ring 732 with one or more keys 734 for encrypting and decrypting files 708. The key ring 732 may be cryptographically protected within the key wrapper 730 in order to prevent malicious access thereto, and the key wrapper 730 may communicate with the extension 710 to provide keys 734 for accessing the files 708 at appropriate times, depending, for example, on whether processes 704 are secure or exposed. In one aspect, the files 708 are stored in a non-volatile memory such as a disk drive, or in a random access memory that provides a cache for the disk drive, and the key wrapper 730 may be stored in a separate physical memory such as a volatile memory accessible to the operating system and the extension 710 but not to processes 704 executing in the user space of the processing environment 702.

In one aspect, every document or file on the endpoint may have a separate key. This may be, for example, a unique, symmetric key that can be used for encryption and decryption of the corresponding file. The key wrapper 730 may control access to the key material for encrypting and decrypting individual files, and may be used by the extension 710 to control access by individual processes 704 executing on the endpoint. As described herein, the extension 710 may generally control access to files 708 based on an exposure state, a security state, or other context such as the user of a calling process or the like. In the event of a severe compromise, or a detection of a compromise independent of particular processes, a key shredding procedure may be invoked to destroy the entire key wrapper 730 immediately and prevent any further access to the files 708. In such circumstances, the keys can only be recovered by the endpoint when a remediation is confirmed. Alternatively, the files may be accessed directly and decrypted from a secure, remote resource that can access the keys 734.

Figure 8:
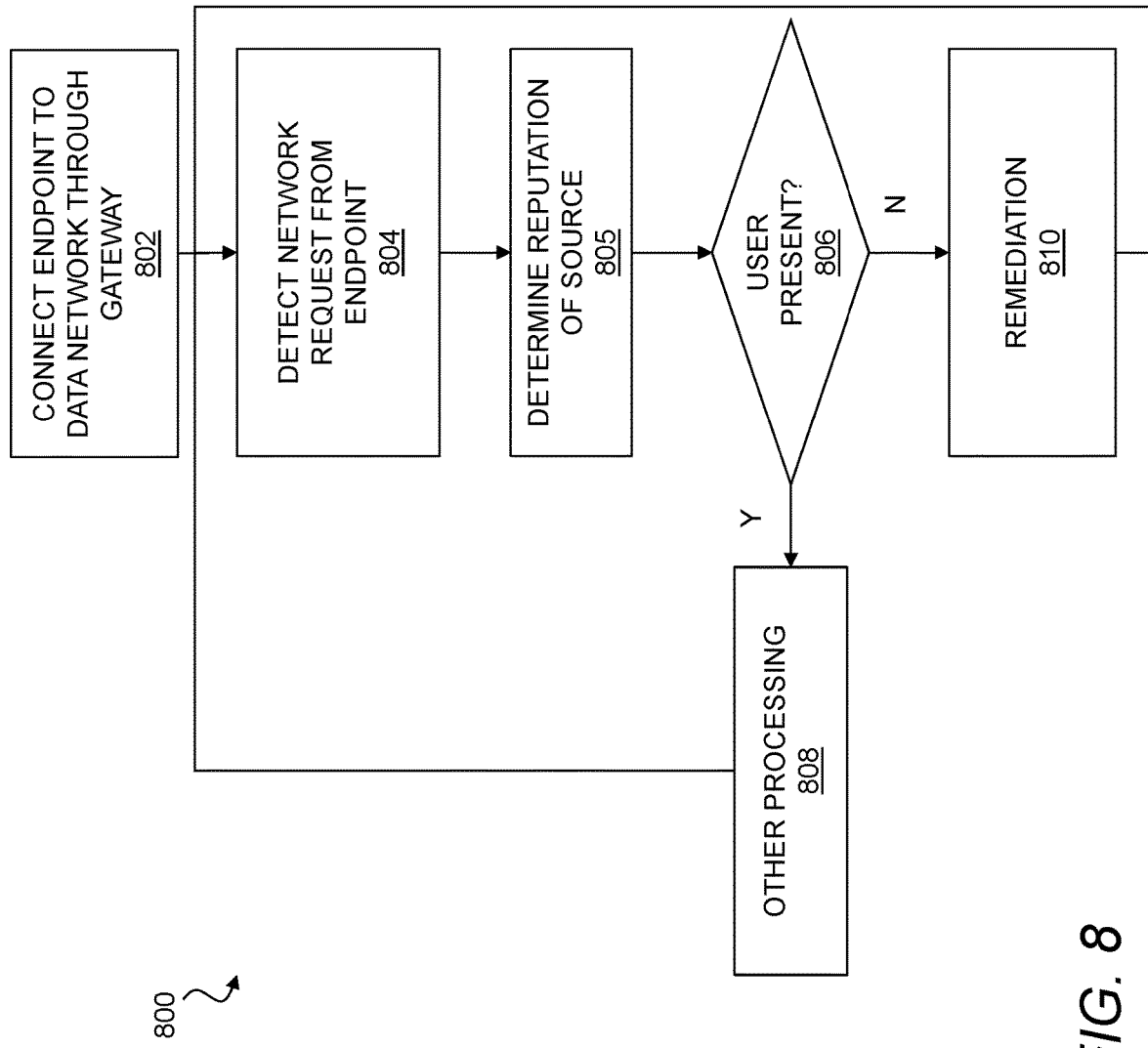
FIG. 8 shows a process for verifying user presence on an endpoint.

FIG. 8 shows a process for verifying user presence on an endpoint. In general, a gateway or other network device may be configured to monitor endpoint behavior, and to determine user presence at the endpoint. The endpoint behavior may suggest compromise, e.g., malware or other endpoint compromise. For example, when a network request is directed to a low-reputation or unknown network address, or a network request is unusual in the amount of data downloaded or uploaded, or a network request involves an unexpected protocol, user presence may be verified to ensure that an action was initiated by a human user rather than automatically by malware or the like. The network device may request a verification of user presence at the endpoint. The network device may request authentication of the user at the endpoint. The network device may receive reports of user presence at the endpoint. The network device may access a record of events that took place at the endpoint to determine user presence. User verification may be implicit, based on local behavior such as keyboard or mouse activity, or application or operating system events, or the user verification may be explicit, such as where a notification is presented on a display of the endpoint requesting user confirmation to proceed, or the user is requested to authenticate, such as by providing a password, authentication code, fingerprint, biometric reading, and so on.

As shown in step 802, the method 800 may include connecting an endpoint to a data network through a gateway. The endpoint may be, for example, a mobile device (e.g., a mobile smartphone, a tablet, a wearable computer), a laptop, a personal computer, a server, a virtual machine, or any other suitable endpoint, for example, as described herein. The gateway may be or may include firewall functionality. The gateway may be or may include router functionality.

As shown in step 804, the method 800 may include detecting a network request at the gateway, the network request initiated by a process executing on the endpoint. The network request may, for example, include any of the network messages described herein, or any other network request. By way of non-limiting example, the network request may include a request for a download of an executable from a data network, a data upload, a text message, an instant message, an HTTP GET, an HTTP PUT request or other request to an address contained in a Uniform Resource Locator entered, e.g., in a browser or similar application, an FTP file transfer request, a request to login to another device on the same network or a different network, or any other manually or automatically generated network request.

In some implementations, step 804 may refer specifically to the detection or other identification of potential or actual compromise. For example, an unusual network request, or a request that may be prohibited or restricted by policy may be detected. A network request may be identified in combination with other network activity or other events.

For example, the network request may not be indicative of an attack, but rather of an application or process that was authorized to be installed, and is accessing resources or otherwise that is communicating in a manner that is not desired by the user or is contrary to a security policy.

A network request may be detected based on the destination of the request. For example, a network request may be detected based on a reputation of a resource such as a remote resource with a low or unknown reputation, or a remote resource known to be associated with malware distribution or the like. This may also or instead include a network request directed to an unknown address, telephone number, messaging destination, or a request directed to a known or suspected source of malware.

In some implementations, the network activity may be identified based on a protocol of the network request. For example, a request that includes a file-sharing or file-distribution protocol may be suspicious.

In some implementations, the network activity may be identified based on the timing of the network request. For example, for a user that usually works during 8 am-6 pm business hours, a network request that takes place outside of these (or other) normal business hours may be unusual, and may thus be indicative of a potential or actual compromise.

In some implementations, the network activity may be identified based on historical patterns of behavior associated with the device, user, or process. For example, for a user that usually works during 8 am-6 pm business hours, a network request that takes place outside of these (or other) normal business hours may be indicative of compromise. Likewise, a file transfer protocol (FTP) request from a device or process that that does not usually use FTP protocol may be indicative of a potential or actual compromise.

A network request may be detected based on context. For example, a pattern of connections to a single resource, an unusual sequence of destination addresses, or some other network activity (or other endpoint behavior) may be indicative of potential compromise of the endpoint. For example, a number of suspicious network requests meeting a threshold number of network requests may be indicative of potential or actual compromise.

In some implementations, a response to the network request may be monitored and included in a determination of potential or actual security risk. For example, if a network request is an authentication request to another device, and the response to the authentication request is that the authentication request is determined to have failed, for example by monitoring a response to the request, the activity may be determined to be indicative of a potential or actual security risk. In some implementations, a pattern of failed authentication requests, such as more than a threshold number of failed authentication requests, may be indicative of a potential or actual security risk.

As shown in step 805, once potentially harmful network traffic is detected, other steps may be taken to provide additional context for evaluation or to reach a conclusion on further action before evaluating user presence. For example, the method 800 may include requesting a reputation of an application on an endpoint that initiated the network request. This may permit direct blacklist or whitelist determinations or the like without requiring additional queries to the endpoint. This may also be particularly useful for identifying circumstances where human presence may be highly relevant to the detection of a security risk. For example, where a connection is opened to a remote location of low or unknown reputation and an upload of data from the endpoint to the remote location is initiated, this pattern would suggest malicious data leakage or exfiltration, and it may be highly advantageous to determine whether a human user is controlling the activity by the endpoint. Similarly, certain protocols that are commonly used to download malware (e.g., peer networking protocols) or upload sensitive data (e.g., a file or data transfer protocol) may provide useful context for an initial decision whether to test for the presence of a human user.

As shown in step 806, the method 800 may include evaluating a status of the endpoint to determine whether a user is present at the endpoint, or whether an authorized user is present at the endpoint. In particular, if there is a reason to suspect the network request potentially poses a security risk, or if there are other indicia of compromise for the endpoint, then a procedure may be initiated to evaluate whether a human user is present on the endpoint and/or whether a human user initiated the network request. For example, the status may include reviewing information communicated by the endpoint. The information communicated by the endpoint may include information associated with the request. The information communicated by the endpoint may include information associated with processes other than the process that generated the request. The information communicated by the endpoint may include information about user activity on the endpoint. The information communicated by the endpoint may include information communicated in response to a request. For example, evaluating the status may include querying the endpoint about whether the user is present. Evaluating the status may include transmitting a request to the endpoint for a user input.

For example, a request for user input may be presented as a pop-up window or other notification with text requesting a response. This may include a simple request such as "click here to continue," or a more instructive narrative such as: "A potential security issue has been detected. Please click here to confirm that you requested the following network activity." This may also or instead include other user input besides clicking, e.g., typing characters into a text box, entering or otherwise providing authentication credentials, answering a security inquiry of information known to the user, or the like. In another aspect, a blocking page may be presented in a web browser that requires human interaction before further network activity can be undertaken.

In another aspect, the presence of a human user may be inferred from endpoint activity or status. For example, information about user activity or user presence may be included in a secure heartbeat from the endpoint, and evaluating the status may include examining the secure heartbeat from the endpoint for information about whether the user is present. The status of the endpoint may include other state information or historical activity indicative of user presence. For example, the status may include whether a user is logged in to the endpoint (which suggests that a human user is presently using the endpoint) or whether a display of the endpoint is displaying a screen saver or is "locked" (which suggests that a human user is not presently using the endpoint). The status may also or instead include other information useful for inferring whether the user is present. For example, the status may include a record of keyboard or mouse activity within a predetermined time window such as a prior minute, a prior five minutes, a prior ten minutes, and so forth.

In another aspect, the presence of a human user may be inferred from activity or status on another endpoint. For example, the information about user activity or user presence may be included in a secure heartbeat from the other endpoint, and evaluating the status may include examining the secure heartbeat from the other endpoint for information about whether the user is present. The status of the other endpoint may include other state information or historical activity indicative of user presence.

In another aspect, the inquiry may include evaluating whether a user was present when the application that generated the network request was launched, which may be relevant in a number of circumstances—particularly where a user might initiate a large online backup or other lengthy download or upload procedure—where a user might intentionally initiate network activity and then log out from an endpoint.

For example, a historical record of user activity on the endpoint may be examined to determine when the user that initiated the request last authenticated to the endpoint, the state of the user's session, one or more processes that were in operation when the network request was initiated, whether the request was initiated as a result of user interaction, and whether the user authorized or directed the network request.

In another aspect, the inquiry may simply include verifying the intent of a user that is known to be present. For example, this method 800 may be usefully employed to prevent a pfishing attack where a legitimate-appearing electronic mail communication contains a link to a malicious site. In this use case, the application may be an electronic mail client (e.g., of presumed unsafe reputation), and the network request coming from the application may be addressed to a location of unknown reputation. In this context, even though a user is known to be present because of the manual link navigation, remediation may be appropriately undertaken, such as by directing the endpoint to present a pop-up window or blocking page that explicitly identifies the target page and requests confirmation of the navigation instruction. For example, the notification may state: "You have requested access to [website]. Are you certain that you wish to navigate to this potentially unsafe network location?"

This and other techniques may be used to evaluate whether a user is present, or whether a user intended to initiate a particular network request.

As shown in step 808, when a user is determined to be present in step 806, other processing may be performed. This may include returning to step 804 where additional network requests may be detected. Of course, other processing, rules, or decision logic may be applied in this context. For example, where a destination address is blacklisted or whitelisted, a decision on forwarding the network flow may be made regardless of whether a user is present. All such existing techniques for conditionally forwarding traffic, including those described elsewhere herein may be used in addition to or instead of detecting user presence, and a method may provide various types of threat detection and security management, either concurrently, sequentially, or in some other order or manner, all without departing from the scope of this disclosure. Thus, it should be appreciated that the techniques described with reference to FIG. 8 (and the other figures in this disclosure) may be intended for use either alone or in combination with other techniques for managing network flows and protecting against security threats in an enterprise network.

As shown in step 810, where it is determined in step 806 that no user is present, the method 800 may include remediation. This may include any response or remediation suitable to the circumstances. For example, when no user is detected at the endpoint, this may include executing a security measure in response to the network request such as blocking the network request, initiating a scan or remediation of the endpoint, blacklisting the destination address, updating a reputation of the destination address, or any other suitable action. It will be understood that the remediation may be contextually selected based, for example, on other available information such as a reputation of the destination address for the network request, or a reputation of an application on the endpoint making the request.

In other circumstances, no remediation may be required. For example, where both the endpoint application and the remote location are updaters, then an endpoint that automatically requests a download without a user present may be a part of a legitimate, periodic software updating protocol. Similarly, where the endpoint application and the remote location both have a known, good reputation, then the activity may be permitted even in the absence of a human user of the endpoint.

When the remediation has been initiated or completed, the method 800 may return to step 804 where a next network request may be detected. In general, this method 810 may be repeated indefinitely so long as an endpoint is active or powered on, or so long as the endpoint is connected to a data network or is otherwise generating network requests.

According to the foregoing, there is disclosed herein a system for verifying user presence associated with network flows. In one aspect, the system may include a network device including a network interface configured to couple in a communicating relationship with a data network that includes an endpoint, a memory on the network device, and a processor on the network device. The processor may be configured to execute instructions stored in the memory to perform the steps of connecting an endpoint to the network device through the network interface, detecting a network request by a process executing on the endpoint to a remote resource that presents a potential security risk, evaluating a status of the endpoint to determine whether a user is present at the endpoint, and executing a security measure in response to the network request when no user is detected at the endpoint. The network device may be any physical or virtual network device including without limitation a firewall, a gateway, a threat management facility, or the like.

In complementary fashion, a system may include an endpoint configured to provide information about user present to such a network device, for example, by including user presence information in a secure heartbeat or other communication to the network device. In one aspect, the system may include an endpoint including a network interface configured to couple the endpoint in a communicating relationship with a data network, a memory on the endpoint, and a processor on the endpoint. The processor may be configured to execute instructions stored in the memory to perform the steps of monitoring a status of the endpoint, periodically creating a status indicator characterizing the status, generating a user presence indicator containing an indication of whether a human user is present at the endpoint, creating a heartbeat containing the status indicator and the user presence indicator, and transmitting the heartbeat through the network interface to a gateway that couples the endpoint to a data network.

Described herein are techniques for securing a mobile device against malware, e.g., through a behavioral analysis of events to detect and identify unexpected behaviors/events. This may be accomplished separately or in addition to the techniques described herein. To this end, the techniques described herein may be specifically tailored for mobile devices such as mobile phones (e.g., smart phones, cellular phones, and so on), tablets, personal digital assistants (PDAs), wearable mobile devices (e.g., smartwatches and the like), and so forth. These mobile devices may, for example, be the endpoints, client devices, or computing devices discussed with reference to the figures above.

A mobile device may be distinguishable from a non-mobile computing device through the inclusion of certain characteristics. These characteristics may include, for example, an operating system specifically configured for mobile use (e.g., ANDROID®, iOS®, WINDOWS® PHONE, BLACKBERRY®, and the like), messaging capabilities (e.g., short message service (SMS) messages and multimedia messages (MMS)), telephone/videophone capabilities, contact or phonebook storage, an interface or association with a mobile carrier and a billing account, camera access, microphone access and audio recording capabilities, data usage capabilities and limitations, a subscriber identity module (SIM) card, mobile online browsing capabilities and limitations, one or more mobile applications, a short-range communications protocol (e.g., Bluetooth and the like), a wireless communications protocol (e.g., Wi-Fi, cellular network, and so on), cellular network limitations (e.g., roaming, limits on minutes of usage or messages sent/received, and the like), and so forth. Also, mobile devices and their operating systems may generally contain a plurality of personally identifiable information, private information, and information users of the mobile devices would typically want control over (and to know whether the mobile device and information included therein is being used as expected). In addition, the smart phone or other device will typically couple to a network through a cellular network and cellular service provider. This may present particular vulnerabilities different from other computing devices where, for example, the smart phone can authorize charges to an account maintained by the service provider for a user of the smart phone. More generally, applications that install on a smart phone can be authorized for a suite of activity including use of a camera, a microphone, a location service (e.g., GPS), a contacts resource (e.g., a directory or other data resource containing owner and third party personal information), a messaging service, an email service, a phone service, and so forth. As such, a mobile device may have specific vulnerabilities with regard to malware. For example, a mobile application may send an SMS message without a user's knowledge to a premium rate service, which could charge a billing account of a user thereby unknowingly costing the user money. By way of example, such applications may include malware and games that use SMS as a payment service to access extra content. A mobile device may also be susceptible to applications that have access to resources and use such permissions to violate privacy conventions or policy. For example, an application that has permission to access a user's address book information and to the internet may send a copy of the user's address book information to another device, such as a server. For example, an application that has permission to access a user's GPS may communicate the user's location to another device, such as a server.

Implementations may use techniques that account for expected events initiated by a user (even if to a premium service) to identify events that are not initiated by the user (even if the same type of event was once previously initiated by the user) and for informing the user that these events are occurring. An identified event that is not initiated by the user may be further analyzed or filtered to determine whether the event is unexpected and potentially unauthorized. To this end, implementations may include the detection of unexpected events occurring without specific user interaction in mobile devices, such as making phone calls, accessing or making changes to the contacts/phone book, accessing user habits such as browser settings/history and other communication logs, accessing files, accessing the camera or microphone, and so forth. In this manner, implementations may analyze specific runtime events relative to patterns of expected user input/interaction, or relative to generalized background behavior occurring without user input/interaction, to determine if events are expected or unexpected and authorized or potentially malicious.

Techniques described herein may further assist in warning a user when an application (or other function/service) is using information (e.g., personally identifiable information or private information) out of context, e.g., in a manner that is unrelated to the user's input/interaction or is otherwise occurring unexpectedly. This may provide a user of a mobile device with information on what events are being executed on their mobile device.

Figure 9:
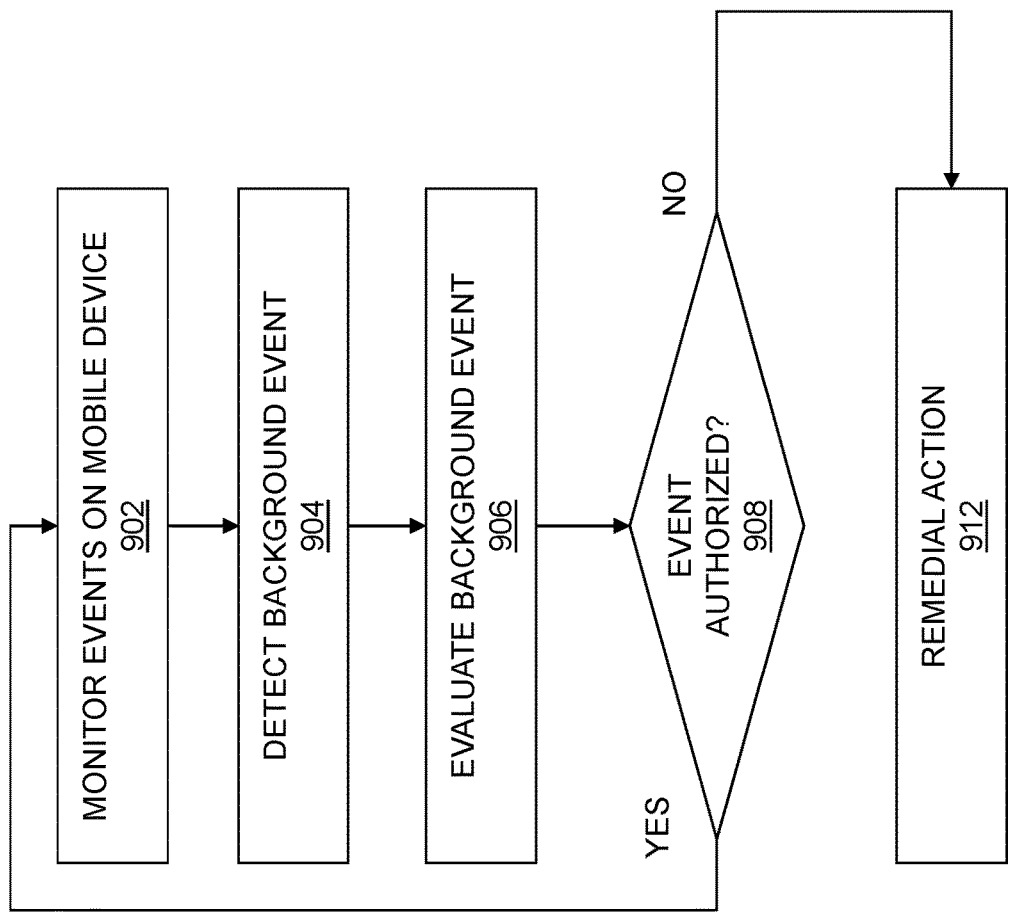
FIG. 9 is a flowchart of a method for securing a mobile device against potential or actual compromise, such as malware.

FIG. 9 is a flowchart of a method for securing a mobile device against potential or actual compromise, such as malware. As discussed herein, 'malware' may refer to a virus, a worm, spam, a phishing exploration, spyware, adware, Trojans, an intrusion, a policy abuse, an uncontrolled access, an unwanted application, a malicious application, a potentially un-wanted application (PUAs), an unwanted behavior (e.g., of an application), a behavior that is noncompliant with a policy (e.g., a security policy or a corporate policy), and so forth.

The method 900 may be specifically tailored for use with mobile devices. This is because mobile operating systems may include security features, events, and user interactions that are specific to mobile devices as compared to other non-mobile computing devices and systems as generally described herein, as well as due to the exposure of a device to a billable account of a device owner. The method 900 may be used in coordination with a gateway or other network device.

The method 900 may implement behavioral monitoring and analysis for the mobile device. For example, through monitoring the mobile device for executed events, and then comparing the executed events against expected user interaction patterns for the mobile device, the method 900 may detect unexpected and anomalous events. Detecting such unexpected events may be used to detect malware such as malicious applications, PUAs, and other applications that may not be intended as malware/PUAs but are executing events outside of the expectations of the user of the mobile device.

As shown in step 902, the method 900 may include monitoring a plurality of events executed on a mobile device. Events included in the plurality of events may include events commonly executed on a mobile device, e.g., where monitoring or security functionality on the mobile device (e.g., a monitoring or security application installed on the mobile device) is configured to set a callback to receive a notification that such events have been executed. The events may include without limitation a communication such as sending or receiving a message (e.g., a SMS, a MMS, an instant message, a chat message, an email message, a web page request, a download request, an upload request, etc.), accessing a resource, making or receiving a phone call or video call, accessing or changing SIM card data, accessing or changing contact or phonebook information, accessing Internet browsing history or other user activity, making a URL request, accessing or changing files or other data stored in a memory of the user device or otherwise accessible through the mobile device (e.g., data stored in a cloud account of the user), accessing and using a camera of the mobile device, accessing and using a microphone of the mobile device, connecting to an external device or network (e.g., via Bluetooth or WiFi), accessing data from another device or generally through a network, and so forth. Events may be associated with applications installed and running on the mobile device. Other types of conventional events in the context of a mobile device, such as events related to user input (button events, touch events), executing programs, and so forth, are also intended to fall within the scope of "events" as that term is used herein to the extent that they might be used to assist in detecting (or confirming the absence of) activity indicative of potential or actual compromise.

Monitoring a plurality of events executed on a mobile device may be performed by a monitoring or security application installed on the mobile device as referenced above, or such monitoring or security functionality may be executed by a processor and a memory include on the mobile device. A software component such as an event handler may be used to detect and dispose of events occurring on the device. Mobile device hardware and operating system software may include functionality to monitor events, and may provide an interface for security functionality to monitor events. A record (e.g., log) of events may be generated, and monitoring or security functionality may monitor the record.

As shown in step 904, the method 900 may include detecting a first event in the plurality of events. The first event may be any event including events listed herein or otherwise known in the art, which may occur when a user is interacting with a device or an application or when a user is not interacting with the mobile device or not interacting with an application that generated the event. The first event may be a background event, such that it is initiated by a process that is not running in the foreground of the mobile device. The first event may be detected using data or behavior associated with the event such as context or comparison with historical record of events. In general, mobile devices may be expected to execute events in the background, so not all such background events may be of interest to a user or to a monitoring or security application, and not all background events may be indicative of potential or actual compromise.

The first event may be an unexpected event, in that it takes place at a time, or with a destination, that is different from historical events associated with the device. The first event may be an unexpected event, in that it takes place at a time, or with a destination, that is different from historical events associated with the user of the device. The unexpected event may be generated by an application executing on the mobile device while a user of the mobile device is not interacting with the application.

In an aspect, a monitoring or security application may be used to detect events sourced from an application that are generally unexpected when the user of the mobile device is not interacting with the application. For example, the monitoring or security application may register a content observer/call back to monitor for predetermined events on the mobile device (e.g., any of the events recited above). The monitoring or security application may detect any such event and log the event. Thus, the monitoring or security application may generate a record of events, including, for example, one or more of: times of events, resources or destinations associated with events, frequency of repeated events, and user interactions associated with the events. The monitoring or security application may determine if the event is linked to a specific user interaction with the mobile device, and classify the event as an unexpected event when the event is not found to be linked to a specific user interaction with the mobile device.

Some examples of unexpected events include the use of a camera or microphone of the mobile device, sending messages, making phone calls, making purchases, uploading data, downloading data, incurring charges to a user's billing account, and so forth, e.g., outside of previous times, destinations, or frequencies of historical patterns. That is, the aforementioned events may typically only take place when a user is interacting with the mobile device, so if these events are occurring outside of patterns of historical usage, they may be identified as unexpected events.

An application that generated the first event may control a tool of the mobile device, for example, a camera of the mobile device or a microphone of the mobile device. The application that generated the first event may also or instead include one or more of the following: a communication application, a phone application, an instant messaging application, and the like. A reputation of the application that generated the event may be considered. In an aspect, the reputation may be a positive reputation, a negative reputation, or an unknown reputation. In an aspect, behavior that is unexpected may be permitted for applications with a known good reputation. Behavior that is unexpected may be flagged for applications that have a negative reputation or an unknown reputation.

A reputation of a resource or destination of the first event may be considered. For example, the first event may include sending an instant message, e.g., where the application includes an instant messaging application. This may include sending or receiving the instant message (although sending an instant message without user interaction is typically more unexpected than receiving an instant message without user interaction). The instant message may include one or more of a SMS message, a MMS, a chat message, and the like. The instant message may incur a charge to a user of the mobile device. The instant message may be directed to a destination with an associated reputation or an unknown reputation. In an aspect, behavior that is unexpected may be permitted for a destination with a known good reputation. Behavior that is unexpected may be flagged for a destination that has a negative reputation or an unknown reputation.

The first event may include a phone call, e.g., where the application includes a phone capability. This may include making or receiving the phone call (although making a phone call without user interaction is typically more unexpected than receiving a phone call without user interaction). This may also or instead include answering the phone call, which would be quite unexpected without user interaction with the mobile device. The phone call may incur a charge to a user of the mobile device.

In an aspect, a communication event that occurs without a specific user interaction may be classified as unexpected. In an aspect, events that incur a charge to a user of the mobile device without a specific user interaction may generally be classified as unexpected.

The first event may include a Uniform Resource Locator (URL) request.

The first event may include access to one or more of a browsing history, personal contacts, and a communications log on the mobile device.

The first event may also or instead include one or more of: accessing or changing data (e.g., SIM card data, stored contacts, or stored files), accessing a web browsing history or other usage data of a user, accessing a camera, accessing a microphone and/or recording audio, and so forth.

As shown in step 906, the method 900 may include evaluating the first event in a context of the mobile device to determine whether the first event is potentially unauthorized. To this end, attributes of events on mobile devices may provide the context that can be utilized to determine whether the first event was legitimate and expected, or unexpected and potentially malicious. For example, evaluating the first event in a context of the mobile device may result in a determination as to whether a user of the mobile device has explicitly allowed or initiated the first event. For example, an event that triggered the first event may be reviewed to see whether the user initiated or authorized the first event.

The context may include one or more other events functionally associated with the event currently being evaluated. For example, the detection of several linked events (or events that are otherwise functionally associated with the event) may provide further context as to whether the first event is expected, or whether the first event is potentially unauthorized. Also, linked events (or events that are otherwise functionally associated with the event) may provide context for a severity of the behavior of an unexpected event.

In an aspect, an order of events or a pattern of events may be used to evaluate an event to determine whether it is potentially unauthorized. This may occur for first events as well as for events associated with a user interaction. For example, a user of the mobile device may have explicitly initiated (through a user interaction) the playing of a game. During game play, and while the user is interacting with the game, an event (e.g., an event associated with the user's accepting to play the game or the user's interaction with the game) may be collecting data from the mobile device and posting the data on a third-party website. This event may be expected or unexpected depending upon, e.g., the reputation of the game, the amount and type of data collected, and so forth. To identify unexpected events in this context, techniques may monitor for a pattern including each of (i) the reading of SIM card data or accessing files/data with specific extensions/locations, and (ii) requesting a URL transaction that includes such data (e.g., to a retail digital subscriber line (DSL) connection or the like).

The context may include one or more other events temporally associated with the event. For example, the timing and frequency of the event in connection with associated events may be used to determine whether the first event is expected, or whether the first event is potentially unauthorized. This may include, for example, whether the first event is associated with an application that was recently installed on the mobile device, whether the first event has been historically executed at certain times (and a comparison of these historically executed times versus the executed time of the detected first event), whether the first event has been historically executed at certain intervals (and a comparison of these historically executed intervals versus an interval related to the detected background and, e.g., a previous event or scheduled future event), and so forth.

Events occurring in close temporal proximity to one another may be compared or otherwise analyzed to determine if a pattern formed by these events can be classified as unexpected behavior or to determine whether the first events are potentially unauthorized. Some examples include without limitation an application, process, or service that sends multiple messages (e.g., SMS or MMS) in close temporal proximity, receives or accesses multiple messages in close temporal proximity, accesses a web browser history and performs a URL request/transaction in close temporal proximity, and so forth. Such patterns of events that take place in the background they may be particularly suspicious. In another aspect, a pattern formed by events occurring in close temporal proximity that can be classified as an unexpected and potentially unauthorized behavior includes (i) accessing SIM card data or accessing files with specific extensions or locations, and (ii) performing a URL request/transaction.

Some events, regardless of whether they are first events or are otherwise associated with a user interaction, may be identified as unexpected or determined to be potentially unauthorized when the events are detected at a frequency that is unexpected. To this end, the frequency or repetition of one or more events may be used for comparison to acceptable ranges for a determination as to whether the events are unexpected or potentially unauthorized. By way of example, events that include the sending of messages (e.g., SMS or MMS), the making of phone calls, or the making of URL requests at a rate beyond a predetermined threshold may be identified as unexpected or potentially unauthorized.

Similarly, events otherwise including unexpected timing characteristics may be identified as unexpected or potentially unauthorized, whether first events or events associated with a user interaction. To this end, when an event is detected, the timing of the event may be compared to a history of the event. The history may include information such as data that is transmitted or received, a destination for data, specific inputs or outputs, and so forth. The history may also or instead include timing data related to events, e.g., for a specific mobile device or for a plurality of mobile devices, such as when events typically occur (e.g., time of day or otherwise), an event frequency (e.g., how often an event typically occurs), when events previously occurred (e.g., the last time an event occurred), when events are scheduled to occur (e.g., the next time an event will occur), and other characteristics of events. The event may be identified as unexpected or potentially unauthorized when the timing of the event deviates from the history by a predetermined amount. By way of example, an event that includes sending a message (e.g., SMS or MMS) at an abnormal time may be identified as unexpected or potentially unauthorized—e.g., messages being sent at a time that historically is associated with a specified period of user inactivity (e.g., a relatively long period of user inactivity).

The context may include a history of recent user interactions with the mobile device generally, and the temporal relationship between the event and these user interactions. The context may also or instead include a history of recent user interactions with the application that generated the event, and the temporal relationship between the event and these user interactions. In other words, an identifiable link between a first event and a user interaction may assist in determining whether the event is expected (e.g., because the user initiated/responded to a user interface request or provided permission) or whether the event is unexpected or potentially unauthorized (e.g., because there was no recent user interaction with the application that generated the event, or more generally with the mobile device).

User interactions related to an event may be used to determine whether an event is unexpected or potentially unauthorized. For example, a determination may be made regarding whether the associated user interactions are expected or unexpected, which can then be used for identifying the event. Expected user interactions may be based on historic user interactions. In this manner, because mobile devices are typically integrated into the lives of their users, expected user interactions may provide a guidepost for detecting unexpected event execution.

The context may include the initiation of the event, e.g., whether the event was initiated by an application on the mobile device or by a user of the mobile device. If it can be determined which application initiated, generated, or executed the event, the reputation of the application may be used for context as explained below, or other information regarding the application may be used for context (e.g., whether the application complies with a security policy, whether the application is on a whitelist or blacklist, and so on).

If identification of the application that initiated the event is not deterministically possible, a heuristic approach may be used, e.g., through data patterns and the like. This may include registering a content observer/call back that monitors which applications are running or have run on the mobile device (e.g., in addition to monitoring for events as described herein). This may also or instead include a comparison between a time that the event was detected with one or more times that one or more applications were running (or started to run) to find matching times or times that are relatively close. Using this technique, the closest match may be the application that generated the event. Reputation data may also or instead be used to identify the application, e.g., further to the heuristic approach described above. For example, identifying the application that initiated the event may include excluding applications having trusted reputations when performing the comparison/analysis of the detected event times with applications that were running at that time. In this manner, the closest match that is not excluded may be identified as the application that generated the event. Installation data for applications may also or instead be used to identify the application that initiated the event, e.g., further to the heuristic approaches described above. For example, identifying the application may include comparing the installation age of the applications that were running at a time that the event was detected (or applications that are relatively close matches in time), where the application with the youngest installation age may be identified as the application that generated the event. This technique may be based on the theory that, because the detected first event is new, the latest installed application relative to the time of the event is likely the application that generated the event.

The context may include a time of the first event. For example, even if the first event is an expected event or otherwise is associated with an expected behavior, the first event may occur at one or more of a time, a frequency, or a pattern that is unexpected. For example, it may be expected that a user of a mobile device sends and receives text messages between the hours of 8 am and 10 pm, where text messages sent or received outside of this timeframe would be unexpected. As such, if a first event was detected as sending one or more text messages at around 3 am, this may be context that the first event is potentially unauthorized, particularly if the user has not interacted with the device for a certain period of time (e.g., a number of hours). Thus, a history of runtime events (e.g., a history that illustrates the common runtimes of events) for a specific user device, or for mobile devices/platforms generally, may be used as contextual information for evaluating the first event.

As referenced above, the context may include a reputation of an application that generated the event. In general, reputation may be locally evaluated by a device using any of a number of rules, tools, signatures, behaviors, data or control relationships, network flows, and so forth, or reputation may be evaluated by a remote threat management facility and reported to the mobile device, or some combination of these. The reputation of the application may be based on one or more of a popularity of the application, a reputation of a provider of the application, and an installed base of the application among a population of users (e.g., the number of users or customers of the application). The popularity of the application may be determined through its popularity in a particular application store, e.g., based on a number of downloads, ratings from users, and the like. The provider of an application may include a publisher of the application, an author of the application, an installer of the application, and so forth, where the provider may be further weighted based on whether the provider is trusted, untrusted, or unknown. The number of applications published or authored, and a length of time for providing applications may also or instead be used in considering the provider of an application. Other factors may also or instead be used as a basis for an application's reputation, including without limitation, a time of installation of the application, an age of the application, information concerning an update to the application (e.g., timing, source, and so on), associative data regarding the application (e.g., whether the application was published by an author/publisher having one or more other associated applications or reputations), a type of the application (e.g., a game, a financial application, a messaging or electronic mail application, a shopping application, an information provider application, a social media application, and the like), and so forth. The reputation may also or instead include information from whitelists/blacklists, detected signatures, information from data patterns, and so forth.

A reputation of an application that generated the event may relate to the trustworthiness of the application or an attribute thereof. The reputation may be retrieved from one or more lists of known reputations for applications—e.g., lists of known sources of malware or known suspicious events, lists of known safe or trusted resources or events, and so on. Reputations may be stored in a memory, database, or data store, such as any of those as described herein. A reputation of an application that generated the event may be expressed in any suitable or useful level of granularity such as with discrete categories (e.g., trusted, untrusted, unknown, malicious, safe, etc.) or with a numerical score or other quantitative indicator. The reputation may also or instead be scaled, e.g., based on any of the attributes or context of the application or event referenced above. The reputation may include or otherwise lead to a binary output (e.g., 'run' and 'don't run', or 'warn' and 'don't warn') or a weighted output describing whether the application or event is within an expected range for making a decision regarding running/stopping an application or event, or for warning a user of the mobile device of the application or event.

The reputation of an application associated with an event may be used in aggregate and/or weighted with any of the other context information recited herein or otherwise known in the art to produce a useful classification of the event or application. For example, an unknown application executing a particular type of event (e.g., accessing contact data in the mobile device) may lead to a determination that that the event is unexpected, and further that the application is potentially malicious. Similarly, a known application having a relatively good/clean/high reputation that is executing events beyond a scope of historic events related to the application may lead to a similar determination that the event is unexpected. However, in this use case, the warning presented to the user of the mobile device may be different than that of a warning for a known malicious application (e.g., the latter warning for the known malicious application would be more severe).

As discussed above, the time of the installation of the application and/or an age of the application may be used for contextual purposes (e.g., using reputations or otherwise) to determine whether an event is potentially unauthorized. This may be useful if there is no prior history of the event—e.g., the age of an application associated with the event can be used to reduce the set of possible offending applications to those installed after the event was detected.

Reputation data (or any of the context information provided herein), in addition to being used to provide context for a determination as to whether an event is potentially unauthorized, may also or instead be used to directly identify whether the first event is unexpected, e.g., further to the techniques described above such as the temporal event analysis or analysis on the order of events/pattern of events. To this end, reputations of applications associated with the event (e.g., applications that are specifically identified or heuristically identified as associated with the event) may be taken into account to exclude a first event that is generated from a trusted application as being identified as unexpected. Thus, in an aspect, to determine whether the first event is unexpected, an application associated with the event may first be identified (using any of the techniques described herein), and a reputation of that application may be analyzed, where, if that application is trusted, the first event is not identified as unexpected.

The context may include inputs or outputs associated with the first event. The inputs or outputs may include communications protocols and/or transmitted data or received data associated with the event. Similarly, the context may include a destination of transmitted data. By way of example, the destination number of an SMS message or a phone call associated with the event can be used for context. This can also or instead include an evaluation of a link or lack thereof between the destination number and known malicious/unwanted numbers, whether the destination number is included in the contacts/phonebook of a mobile device, a length of time the destination number has been included in the contacts/phonebook of a mobile device, a message history or a phone call history of a mobile device (e.g., a history of sending messages or making calls to the exact destination number, a history of sending messages or making calls to similar destination numbers, a history of sending messages or making calls to destination numbers with the same country code as the destination number, and so on), whether a country code of the destination number is the same as that of a mobile device, whether a mobile device is currently roaming, whether the destination number is the same or similar to a number associated with a payment service (e.g., a premium rate service number), and so forth. As another example, a destination of a URL or other web traffic (e.g., a destination address) associated with the event can be used for context. This may also or instead include whether the destination address is a trusted site or a known malicious/infected site (e.g., included in a whitelist/blacklist), whether information transmitted to the destination address includes identifiable data (such as an Internet Protocol (IP) address, an International Mobile Equipment Identity (IMEI) number, a phone number, a mobile service provider code, and the like), whether the destination address is a known dynamic Domain Name System (DNS) service or a non-corporate Internet service host (e.g., a home DSL connection), and so forth.

The context may include a location of data accessed by the event. For example, the context may include a determination as to whether files accessed by the event are located in default locations such as camera images. The context may also or instead include the extensions of files that are accessed, e.g., whether the accessed files are text/word documents, presentations, images, videos, and so forth. The context may also or instead include whether any accessed data is deemed to be sensitive, e.g., identifiable data such as an IP address, an IMEI number, a phone number, a mobile service provider code, and so on.

The context may include activity on, or the status of, another endpoint. For example, information about user activity or user presence may be included in a secure heartbeat from another endpoint or a gateway, and evaluating the context may include examining the secure heartbeat from another endpoint or gateway for context about the user, the network, or otherwise. The secure heartbeat may include other status information, historical activity, current activity information, user presence information, or any other suitable information.

Evaluating the first event in a context of the mobile device may include combining or weighting the detection of the first event with the context or a factor related to the context.

It will be understood that a variety of techniques are available for detecting user interaction, or more generally determining whether a user is currently using or interacting with a mobile device. In one aspect, user interaction may be directly detected or measured based on, e.g., button pushes, touch events or other touch screen interactions, and so forth. In another aspect, user interaction may be inferred based on whether a mobile device is screen locked or active. For example, a mobile device may be configured to automatically lock after a period of non-use and present a lock screen requiring a biometric activation (e.g., facial image, thumbprint, or the like), passcode, PIN, or other input for further use. When the mobile device becomes locked, a reasonable inference may arise that the user is not interacting with the mobile device. Similarly, if a user input has been received within a recent window of several seconds or minutes, a reasonable inference may arise that a user is interacting with the mobile device even where a particular event is not explicitly linked to a user interaction. In another aspect, where media such as a video is playing, user interaction may be inferred even during prolonged periods without a user input. These or any other techniques suitable for explicitly or implicitly determining whether a user is interacting with a mobile device may be usefully employed to identify user interaction as contemplated herein. Thus in general, detection of user interaction may be based on time, input events, device status, or some combination of these. Where user interaction is uncertain and highly relevant, user presence may be confirmed, such as by presenting a window requesting confirmation of active use (e.g., "Your device is trying to transmit an unexpected SMS message. Can you confirm that you wish to send this?") or by using a camera for facial recognition or tracking of eye movements.

As shown in step 908, the method 900 may include determining whether the first event is authorized, which can occur through the evaluation of the first event as recited in step 906 above. In an aspect, if the event is determined to be authorized, the method 900 may proceed to step 910, and if the event is determined to be unauthorized or potentially unauthorized, the method 900 may proceed to step 912.

Where an event is authorized, the method 900 may return to step 902 where monitoring may continue for further events. In general, this will include taking no further action for securing the mobile device against the particular first event if the first event is determined to be authorized, e.g., through the evaluation of the first event. In another aspect, a user notification may be provided notifying the user that the first event occurred or is occurring, such as where a determination is uncertain and a record may be useful. The notification may be less intrusive or severe than a notification for an unauthorized first event. The particular first event may also or instead be recorded, e.g., in a log in a memory of the mobile device to provide context for subsequent analysis of other events.

As shown in step 912, when the first event is a potentially unauthorized event (or if the first event is confirmed as being unauthorized), a remedial action may be taken. This may, for example, include presenting a warning to the user on the mobile device that the potentially unauthorized event has occurred, and requesting user confirmation that the potentially unauthorized event be allowed to continue. The warning may include a notification sent to the user on the mobile device (or otherwise) that an unexpected, and potentially unauthorized, event has occurred. The notification may be sent to the user using one or more of a message (e.g., SMS message), an email, a push notification, an audio noise, a vibration, a visual alert (e.g., as a pop-up message on a display of the mobile device or on a light or the like included on the mobile device), and the like. The warning may include information regarding the specific event such as event attributes, an application that generated the event, when the event occurred, and so forth. The warning may supply the user with an option for stopping the event or terminating an application that generated the event. The warning may also or instead supply the user with an option for uninstalling or otherwise removing an application that generated the event from the mobile device.

The warning may be used or aggregated with static information to determine a classification for an application associated with the event. For example, static information may include a set of resources in which an application is allowed to access, e.g., resources typically associated with an additional cost to the user of the mobile device.

The severity of the warning may be related to the level/severity of the first event, e.g., the maliciousness of the event. The maliciousness of the first event may be determined based on a reputation of the application that generated the event. For example, if the reputation of the application that generated the event is 'untrusted' or the like, the warning may include multiple notifications where each notification includes one or more sensory warnings (e.g., a vibration, a flashing of light, and the like). Similarly, if the reputation of the application that generated the event is 'unknown' or the like, the warning may include a single notification without any additional sensory warnings. To alert a user to a risk posed by the first event, the warnings may also or instead include a numerical score, a color-coded indicator (e.g., red is high severity, yellow is medium severity, and green is low severity), or other quantitative indicator.

Remediation may include any response or remediation suitable to the circumstances. For example, this may include executing a security measure in response to the network request such as blocking the activity, initiating a scan or remediation of the mobile device, blacklisting an application or destination address, updating a reputation of the application or destination address, or any other suitable action. It will be understood that the remediation may be contextually selected based, for example, on other available information such as a reputation.

In other circumstances, no remediation may be required. For example, where an application or a remote location are known updaters, then a mobile device that automatically requests a download without a user present may be a part of a legitimate, periodic software updating protocol. Similarly, where an application and a resource or remote location both have a known, good reputation, then the activity may be permitted even in the absence of other context.

When remediation has been initiated or completed, the method may be repeated.

In an aspect, a detected unexpected event that is determined to be unauthorized (or potentially unauthorized) may be automatically stopped from executing/running on the mobile device. In another aspect, an application that generated an unexpected event that is determined to be unauthorized (or potentially unauthorized) may be automatically removed from the mobile device.

Other remedial actions may also or instead be taken. For example, cellular radio and other communications hardware (e.g., radios for Bluetooth, WiFi, etc.) may be deactivated to prevent further network communications to and from the device. In another aspect, communications may be restricted to exclusive communications with a threat management facility so that a compromised condition can be remediated before restoring other network communications. In another aspect, all services or applications may be suspended except for a local remediation agent or similar program until the device has been adequately remediated. More generally, any techniques for suspending operation of the device and or initiating remediation may be usefully performed in step 912.

The method 900 described above may be implemented by a computer program product for securing a mobile device against malware, where the computer program product comprises computer executable code embodied in a non-transitory computer readable medium that, when executing on the mobile device, performs the steps of the method 900. It will be understood that, while the method 900 described above is referenced to events occurring when there is no user interaction, other types of unexpected behavior may also or instead be identified. This may, for example, include any behavior atypical for a user even when user presence is detected, such as a large number of texts or emails while a user is playing a game on the mobile device. Thus, context such as time of day, open applications, current user interactions, and the like may be used instead of or in addition to detections of user presence as useful context for detecting unexpected behavior.

Figure 10:
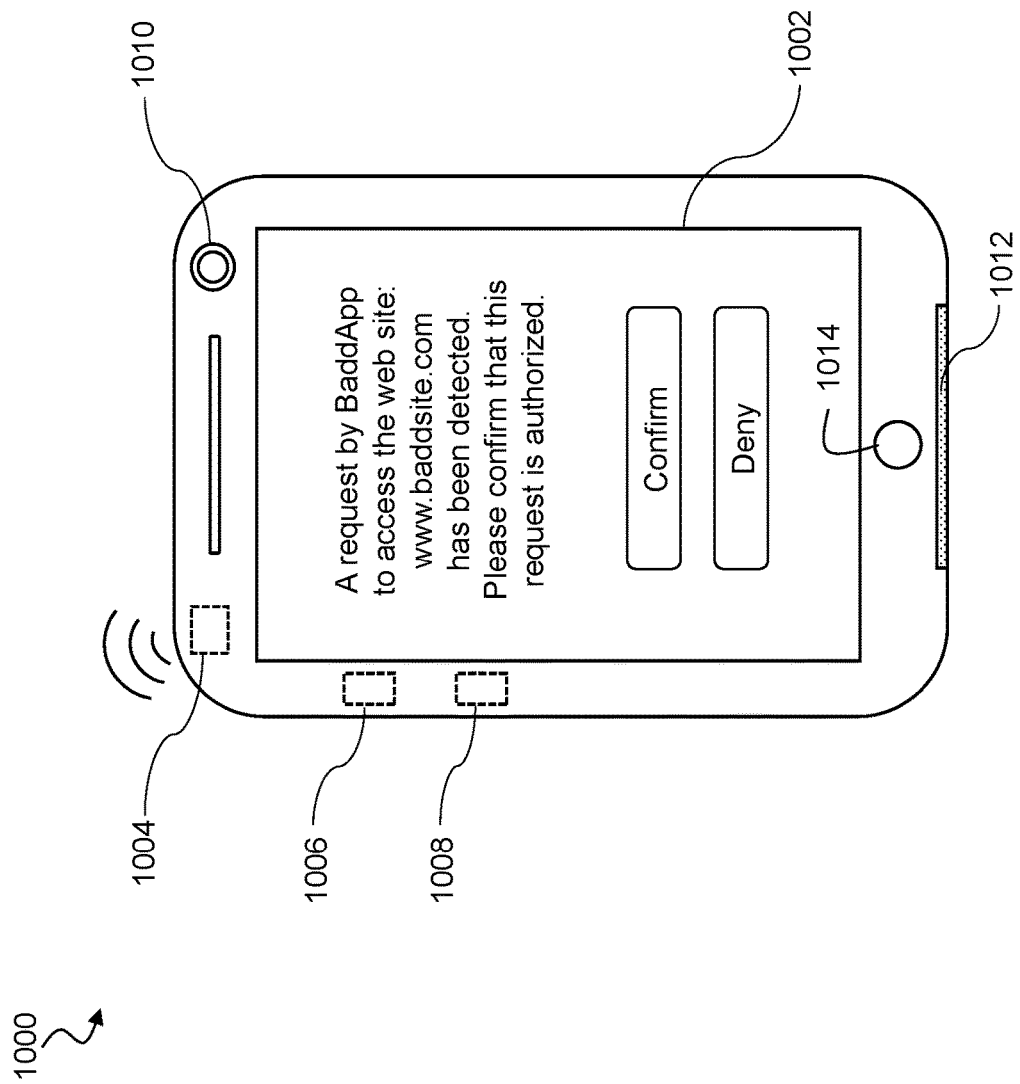
FIG. 10 shows an example display of a mobile device according to an implementation.

FIG. 10 shows an example display of a mobile device according to an implementation. The mobile device 1000 may be configured for protection against malware as described herein. The mobile device 1000 may be, for example, any of the endpoints or other computing devices described above. The mobile device 1000 may be, for example, a smart phone or a tablet. In general, the mobile device 1000 may include a display 1002, a communications interface 1004 configured to couple the mobile device 1000 in a communicating relationship with a network, a processor 1006, a memory 1008, a camera 1010, and a microphone 1012.

The communications interface 1004 may include hardware and software for communications using a variety of protocols such as a short range communications protocol (e.g., Bluetooth), a wireless communications protocol (e.g., Wi-Fi, cellular network, and so on), and so forth. The communications interface 1004 may couple the mobile device 1000 to a cellular network or the like through a mobile carrier with which a user has a billing account. The communications interface 1004 may also or instead couple the mobile device 1000 to a data network through which the mobile device 1000 can access an online application store or the like.

In an aspect, the memory 1008 bears computer code that, when executing on the processor 1006, performs steps for securing the mobile device 1000 against malware. These steps may include monitoring a plurality of events executed on the mobile device such as any of the events described above, and detecting a first event in the plurality of events. The first event may be an unexpected event generated by an application executing on the mobile device 1000 while a user of the mobile device 1000 is not interacting with the application. The steps for securing the mobile device 1000 against malware may further include evaluating the first event in a context of the mobile device 1000 to determine whether the first event is potentially unauthorized. When the first event is a potentially unauthorized event, the steps for securing the mobile device 1000 against malware may include presenting a warning to the user that the potentially unauthorized event has occurred.

The display 1002 may include a touch screen or other device for receiving user input that can be used to detect user presence or user interaction as contemplated herein. The camera 1010 or microphone 1012 may also be configured to detect and identify the user and receive user input indicating of user presence and/or interaction. In another aspect, the mobile device 1000 may include one or more buttons 1014 for receiving manual user input that can be used to generate user interaction events indicative of user interaction and presence. More generally, any hardware, software, or combination of these suitable for receiving user input or otherwise detecting user presence or intent may be used to create indications of user interaction as contemplated herein.

As shown in the exemplary display, security functionality has identified an unexpected event, in this case a request by application "BaddApp" to access the web site: 'www-.baddsite.com.' The exemplary display requests user confirmation that the unexpected event be permitted to continue. In this way, the device can determine whether a user is aware of the activity and whether the activity is authorized.

In an aspect, the display on the mobile device requesting confirmation by the user may be related to activity on the mobile device. In an aspect, the display on the mobile device requesting confirmation by the user may be related to activity on another endpoint. Another device, such as a gateway or another endpoint, identifies a potential or actual security threat. Using a heartbeat functionality on the mobile device, an instruction to the mobile device is communicated securely to request user the confirmation of activity on the mobile, device, another device or recognized by the another device (e.g., a gateway). In an aspect, the display may require authentication, or submission of authentication data such as a PIN, password, biometric information, etc. to confirm authorization.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for monitoring network security based on endpoint user presence, the computer program product comprising computer executable code embodied in a non-transitory computer readable medium that, when executing on a gateway in an enterprise network, performs the steps of:
    connecting an endpoint of the enterprise network to a data network through the gateway;
    receiving a network request at the gateway, the network request received from a process executing on the endpoint and the network request to a remote resource on the data network outside the enterprise network;
    determining, by the gateway, that the network request includes a potential security risk of requesting to download an executable in violation of a security policy of the enterprise network;
    in response to determining that the network request includes the potential security risk,
        (i) requesting from the endpoint, by the gateway connecting the endpoint to the data network, a historical record of keyboard or mouse activity on the endpoint for a predetermined time window prior to receipt, by the gateway, of the network request that includes the potential security risk, and
        (ii) determining, by the gateway, based at least in part on the historical record of keyboard or mouse activity received from the endpoint, whether the network request was initiated as a result of user interaction by a human user; and
    in response to detecting that the network request includes the potential security risk of downloading an executable and determining that the network request was not initiated by a human user, initiating, at the gateway, a remedial action that includes executing a security measure on the endpoint in response to the potential security risk presented by the network request.

2. The computer program product of claim 1 wherein determining whether the network request was initiated by a human user includes transmitting a request to the endpoint for a user input.

3. The computer program product of claim 1 wherein determining whether the network request was initiated by a human user includes determining whether a user is logged in to the endpoint.

4. The computer program product of claim 1 wherein determining whether the network request was initiated by a human user includes determining whether a display of the endpoint is locked.

5. A method of operating a gateway comprising:
connecting an endpoint of an enterprise network to a data network through the gateway;
determining, by the gateway, that a network request by a process executing on the endpoint to a remote resource on a data network outside the enterprise network includes a potential security risk of requesting to download an executable in violation of a security policy of the enterprise network;
in response to determining that the network request includes the potential security risk,
(i) requesting from the endpoint, by the gateway connecting the endpoint to the data network, a historical record of keyboard or mouse activity on the endpoint for a predetermined time window prior to receipt, by the gateway, of the network request that includes the potential security risk, and
(ii) determining, by the gateway, based at least in part on the historical record of keyboard or mouse activity received from the endpoint, whether the network request was initiated as a result of user interaction by a human user; and
initiating, at the gateway, a remedial action that includes executing a security measure on the endpoint in response to detecting the network request by the process executing on the endpoint that includes the potential security risk, evaluating a status of the endpoint, and determining that the network request was not initiated by a human user.

6. The method of claim 5 wherein the network request includes a request for a download of an executable from the data network.

7. The method of claim 5 wherein the network request includes a request directed to an unknown address.

8. The method of claim 5 wherein the network request includes a request directed to a known source of malware.

9. The method of claim 5 wherein evaluating the status of the endpoint includes querying the endpoint about whether the user is present.

10. The method of claim 5 wherein evaluating the status of the endpoint includes transmitting a request to the endpoint for a user input.

11. The method of claim 5 wherein the status includes whether a user is logged in to the endpoint.

12. The method of claim 5 wherein the status includes whether a display of the endpoint is locked.

13. A system comprising:
a gateway including a network interface configured to couple in a communicating relationship with a data network;
a memory on the gateway; and
a processor on the gateway, the processor configured to execute instructions stored in the memory to perform the steps of
connecting an endpoint of an enterprise network to the gateway through the network interface so as to establish a communicating relationship between the endpoint and the data network,
determining, by the gateway, that a network request by a process executing on the endpoint to a remote resource on the data network outside the enterprise network includes a potential security risk of requesting to download an executable in violation of a security policy of the enterprise network,
in response to determining that the network request includes the potential security risk,
(i) requesting from the endpoint, by the gateway connecting the endpoint to the data network, a historical record of keyboard or mouse activity on the endpoint for a predetermined time window prior to receipt, by the gateway, of the network request that includes the potential security risk, and
(ii) determining, by the gateway, based at least in part on the historical record of keyboard or mouse activity received from the endpoint, whether the network request was initiated as a result of a user interaction by a human user, and
in response to detecting the network request that includes the potential security risk and a determination that the network request was not initiated by the human user, initiating a remedial action that includes executing a security measure on the endpoint.

14. The system of claim 13 wherein the network request includes a request for a download of an executable from the data network.

15. The system of claim 13 wherein the network request includes a request directed to an unknown address.

16. The system of claim 13 wherein the network request includes a request directed to a known source of malware.

17. The system of claim 13 wherein determining whether the network request was initiated as a result of the user interaction includes querying the endpoint about whether the user is present.

18. The system of claim 13 wherein determining whether the network request was initiated as a result of the user interaction includes transmitting a request to the endpoint for a user input.

19. The system of claim 13 wherein determining whether the network request was initiated as a result of the user interaction includes determining whether a user is logged in to the endpoint.

20. The system of claim 13 wherein determining whether the network request was initiated as a result of the user interaction includes determining whether a display of the endpoint is locked.

* * * * *